United States Patent
Jin et al.

(10) Patent No.: US 11,470,674 B2
(45) Date of Patent: Oct. 11, 2022

(54) COMMUNICATION METHOD AND COMMUNICATIONS APPARATUS

(71) Applicant: Huawei Technologies Co., Ltd., Shenzhen (CN)

(72) Inventors: Yinghao Jin, Shanghai (CN); Tingting Geng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/126,563

(22) Filed: Dec. 18, 2020

(65) Prior Publication Data

US 2021/0195678 A1 Jun. 24, 2021

Related U.S. Application Data

(63) Continuation of application No. PCT/CN2019/092341, filed on Jun. 21, 2019.

(30) Foreign Application Priority Data

Jun. 21, 2018 (CN) .................. 201810646904.X
Aug. 10, 2018 (CN) .................. 201810912130.0

(51) Int. Cl.
*H04W 76/19* (2018.01)
*H04W 12/08* (2021.01)

(52) U.S. Cl.
CPC ........... *H04W 76/19* (2018.02); *H04W 12/08* (2013.01)

(58) Field of Classification Search
CPC .............................. H04W 12/08; H04W 76/19
(Continued)

(56) References Cited

U.S. PATENT DOCUMENTS

2010/0278037 A1* 11/2010 Jen ................. H04W 76/19
 370/216
2015/0098384 A1* 4/2015 Deng ................. H04W 72/042
 370/312
(Continued)

FOREIGN PATENT DOCUMENTS

CN 107889274 A 4/2018
CN 108040367 A 5/2018
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V15.2.0, Jun. 2018, 217 pages.

(Continued)

*Primary Examiner* — Joel Ajayi
(74) *Attorney, Agent, or Firm* — Slater Matsil, LLP

(57) ABSTRACT

A communication method and apparatus, the method including receiving, by a first access network device, a first message from a terminal in a radio resource control (RRC) inactive state, where the first message requests to resume an RRC connection or to perform a radio access network-based notification area update (RNAU), and sending, by the first access network device, a first request message to a second access network device, where the first request message includes a cell radio network temporary identifier allocated by the first access network device for the terminal, and the second access network device is an access network device that retains a context of the terminal, and there is a control plane link of the terminal between the second access network device and a core network.

11 Claims, 6 Drawing Sheets

(58) Field of Classification Search
USPC .......................................................... 455/410
See application file for complete search history.

(56) References Cited

U.S. PATENT DOCUMENTS

| | | | | |
|---|---|---|---|---|
| 2018/0227851 | A1* | 8/2018 | Kubota | ............. H04W 52/0229 |
| 2019/0059119 | A1 | 2/2019 | Hapsari et al. | |
| 2021/0084496 | A1 | 3/2021 | Yang | |

FOREIGN PATENT DOCUMENTS

| | | |
|---|---|---|
| CN | 107666692 B | 9/2019 |
| JP | 2021525987 A | 9/2021 |
| WO | 2017078143 A1 | 5/2017 |
| WO | 2018097528 A1 | 5/2018 |
| WO | 2019233432 A1 | 12/2019 |
| WO | 2020092527 A1 | 5/2020 |

OTHER PUBLICATIONS

"3rd Generation Partnership Project; Technical Specification Group Services and System Aspects; Security architecture and procedures for 5G system (Release 15)," 3GPP TS 33.501 V15.0.0, Mar. 2018, 128 pages.
"3rd Generation Partnership Project; Technical Specification Group Radio Access Network Evolved Universal Terrestrial Radio Access (E-UTRA); Medium Access Control (MAC) protocol specification (Release 15)," 3GPP TS 36.321 V15.1.0, Mar. 2018, 109 pages.
"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331 V15.2.0, Jun. 2018, 791 pages.
"3rd Generation Partnership Project; Technical Specification Group Radio Access Network; NR; NR and NG-RAN Overall Description; Stage 2 (Release 15)," 3GPP TS 38.300 V15.2.0, Jun. 2018, 87 pages.
"3rd Generation Partnership Project; Technical Specification Group Radio Access Network; NR; Radio Resource Control (RRC) protocol specification (Release 15)," 3GPP TS 38.331 V15.2.0, Jun. 2018, 304 pages.
"3rd Generation Partnership Project; Technical Specification Group Radio Access Network; NG-RAN; NG Application Protocol (NGAP) (Release 15)," 3GPP TS 38.413 V1.0.0, Jun. 2018, 265 pages.
"3rd Generation Partnership Project; Technical Specification Group Radio Access Network; NG-RAN; Xn application protocol (XnAP) (Release 15)," 3GPP TS 38.423 V1.0.0, Jun. 2018, 194 pages.
"Synchronization of UE Context During RNA Update Procedure," Agenda item: 10.4.1.7.7, Source: LG Electronics Inc., Document for: Discussion and Decision, 3GPP TSG-RAN WG2 #101, R2-1803017 was R2-1801358, Athens, Greece, Feb. 26-Mar. 2, 2018, 4 pages.

"UE AS Context for RRC_Inactive," Agenda item: 10.4.1.7.3, Source: Qualcomm Incorporated, WID/SID: NR_newRAT-Core—Release 15, Document for: Discussion and Decision, 3GPP TSG-RAN WG2 Meeting #101bis, R2-1805090 Revision of R2-1803588, Sanya, China, Apr. 16-Apr. 20, 2018, 4 pages.
"UE AS Context for RRC_Inactive," Agenda item: 10.4.1.7.3, Source: Qualcomm Incorporated, WID/SID: NR_newRAT-Core—Release 15, Document for: Discussion and Decision, 3GPP TSG-RAN WG2 Meeting #101, R2-1806888 (revision of R2-1805090), Busan Korea, May 21-May 25, 2018, 4 pages.
"UE Behaviour for Pending AS Procedures after Cell Reselection (offline discussion #36)," Source: ZTE Corporation (Offline discussion rapporteur), Agenda item: 10.4.1.3.6, Document for: Discussion and Decision, 3GPP TSG-RAN WG2 Meeting#102, R2-1809112, Busan, Korea, May 21-25, 2018, 11 pages.
"Left Issues on Inactive UE over F1 Interface," Agenda item: 10.10.3, Source: ZTE, Document for: Discussion and Approval, 3GPP TSG RAN WG3 NR Adhoc, R3-180126, Sophia Antipolis, France, Jan. 22-26, 2018, 8 pages.
"3rd Generation Partnership Project; Technical Specification Group Radio Access Network; Evolved Universal Terrestrial Radio Access Network (E-UTRAN); X2 application protocol (X2AP) (Release 15)," 3GPP TS 36.423, V15.2.0, XP051526686, Jun. 2018, 389 pages.
"On the Support of Periodical RNA Update without Context Relocation," Agenda Item: 10.4.1.7.3, Source: Huawei, HiSilicon, Document for: Discussion and Decision, 3GPP TSG-RAN WG2 Meeting #101, R2-1802794, Athens, Greece, Feb. 26-Mar. 2, 2018, 4 pages.
"Support of RNA Update without Context Relocation," Agenda Item: 10.4.1.3.9, Source: Huawei, HiSilicon, Document for: Discussion and Decision, 3GPP TSG-RAN WG2 Meeting #103bis, R2-1814133, Chengdu, China, Oct. 8-12, 2018, 4 pages.
"RRC_Inactive—Security Handling at State Transition," Source to WG: Ericsson, Source to TSG: S3, Work Item Code: 5GS_Ph1-SEC, 3GPP TSG-SA WG3 Meeting #91, S3-181304, Belgrade, Serbia, Change Request, Apr. 16-20, 2018, 5 pages.
3rd Generation Partnership Project; Technical Specification Group Radio Access Network; Evolved Universal Terrestrial Radio Access Network (E-UTRAN); X2 Application Protocol (X2AP) (Release 15), 3GPP TS 36.423, V15.1.0, Mar. 2018, 354 pages.
"RRC Inactive—Discussion on Various Security Aspects," Source: Ericsson, Document for: Discussion, Agenda Item: 7.2.4, 3GPP TSG SA WG3 (Security) Meeting #91, S3-181303, Belgrade (RS), Apr. 16-Apr. 20, 2018, 3 pages.
"Security of REJECT Message," Source: ZTE Corporation, Sanechips, Agenda Item: 10.4.1.7.2, Document for: Discussion and Decision, 3GPP TSG-RAN WG2 Meeting #101 bis, R2-1804460, Apr. 16-20, 2018, 7 pages.
"Support of RNA Update Without Context Relocation," Agenda Item: 10.4.1.7.2, Source; Huawei, HiSilicon, Document for: Discussion and Decision, 3GPP TSG-RAN WG2 Meeting AH-1807, R2-1810363, Jul. 2-6, 2018, 7 pages.

* cited by examiner

US 11,470,674 B2

COMMUNICATION METHOD AND COMMUNICATIONS APPARATUS

CROSS-REFERENCE TO RELATED APPLICATIONS

This application is a continuation of International Application No. PCT/CN2019/092341, filed on Jun. 21, 2019, which claims priority to Chinese Patent Application No. 201810646904.X, filed on Jun. 21, 2018, and Chinese Patent Application No. 201810912130.0, filed on Aug. 10, 2018. All of the aforementioned patent applications are hereby incorporated by reference in their entireties.

TECHNICAL FIELD

This application relates to the field of communications technologies, and in particular, to a communication method and a communications apparatus.

BACKGROUND

In a 5th generation (5G) system, when a terminal is in a radio resource control (RRC) inactive state, the terminal may not notify a network side if moving within a radio access network-based notification area (RNA), and the terminal notifies the network side if moving out of the RNA. For example, if moving out of the RNA, the terminal performs a radio access network-based notification area update (RNAU) to notify the network side.

When performing the RNAU in the RRC inactive state, the terminal includes, in a message that is sent by the terminal to a base station and used for requesting to resume an RRC connection or requesting to perform the RNAU, a security parameter generated based on a security verification parameter, for example, a message authentication code for integrity (MAC-I) or a short MAC-I. The short MAC-I is a part of a complete MAC-I, for example, 16 least significant bits of the MAC-I. After receiving the security parameter, the base station uses an internally stored security verification parameter to verify the security parameter. If the internally stored security verification parameter of the base station is consistent with an input parameter (the security verification parameter) of the security parameter carried in the message for requesting to resume the RRC connection or requesting to perform the RNAU, the security verification succeeds. If the internally stored security verification parameter of the base station is inconsistent with an input parameter (the security verification parameter) of the security parameter carried in the message for requesting to resume the RRC connection or requesting to perform the RNAU, the security verification fails.

When the terminal performs a plurality of RNAUs in the RRC inactive state, each time before the terminal requests a new serving base station to resume an RRC connection or to perform an RNAU, the terminal obtains, by performing a random access process, a security verification parameter allocated by the new serving base station to the terminal. In addition, the terminal may further store a security verification parameter allocated by an anchor base station to the terminal. In this case, the terminal may obtain, from the plurality of RNAUs, a plurality of security verification parameters respectively allocated by a plurality of base stations to the terminal and the security verification parameter allocated by the anchor base station to the terminal. When re-initiating an RNAU process, the terminal needs to determine a currently used security verification parameter in the security verification parameters to generate a security parameter, and include the security parameter in a message for requesting to resume an RRC connection or requesting to perform an RNAU. Security verification succeeds and then the RNAU succeeds, only when an input parameter (the security verification parameter) of the security parameter carried in the message for requesting to resume the RRC connection or requesting to perform the RNAU is consistent with a security verification parameter used by an access network device for security verification. How to determine the security verification parameter becomes an urgent problem to be resolved in the RNAU.

SUMMARY

Embodiments of this application provide a communication method, and a communications apparatus and system, so that a terminal and an access network device can use consistent security verification parameters to successfully implement security verification in an RNAU process.

To achieve the foregoing objective, the following technical solutions are used in the embodiments of this application.

According to a first aspect, this application provides a communication method and a communications apparatus.

In a possible design, the method may include sending a first message to an access network device, and receiving a second message from the access network device, where the first message is used for requesting to resume an RRC connection or requesting to perform an RNAU, the second message includes first information, the first information is related to a security verification parameter, and the security verification parameter includes a C-RNTI, and determining the security verification parameter based on the first information. In this method, in an RNAU process, the terminal determines, based on an indication of the access network device, whether an anchor access network device is changed on a network side, to determine the security verification parameter. This may ensure that an input parameter of a security parameter carried in the message of the terminal for requesting to resume the RRC connection or requesting to perform the RNAU is consistent with a security verification parameter stored by the access network device, so that security verification succeeds in the RNAU process.

In a possible design, the first information indicates whether the security verification parameter needs to be changed, and the determining the security verification parameter based on the first information includes determining, depending on whether the first information is received, whether the security verification parameter needs to be changed, or determining, based on content of the first information, whether the security verification parameter needs to be changed. In this implementation, the terminal determines, based on the indication of the access network device, whether the security verification parameter needs to be changed, so that the input parameter of the security parameter carried in the message for requesting to resume the RRC connection or requesting to perform the RNAU is consistent with the security verification parameter stored by the access network device.

In a possible design, the first information indicates the security verification parameter, and the determining the security verification parameter based on the first information includes determining the security verification parameter depending on whether the first information is received, or determining the security verification parameter based on content of the first information. In this implementation, the terminal determines the used security verification parameter based on the indication of the access network device, so that the input parameter of the security parameter carried in the message for requesting to resume the RRC connection or requesting to perform the RNAU is consistent with the security verification parameter stored by the access network device.

In a possible design, the security verification parameter further includes a physical cell identifier PCI.

In a possible design, the second message includes an RRC release message, an RRC reject message, an RRC connection release message, or an RRC connection reject message.

In a possible design, the sending a first message to an access network device includes in a first status, sending the first message to the access network device, where the first status indicates that a context of the terminal is retained on both the terminal and an access network side when uplink synchronization may not be maintained between the terminal and the access network side.

Correspondingly, this application further provides a communications apparatus, and the apparatus can implement the communication method in the first aspect. For example, the apparatus may be a terminal or a chip applied to a terminal, or may be another apparatus that can implement the foregoing communication method. The apparatus may implement the foregoing method by using software, hardware, or hardware executing corresponding software.

In a possible design, the apparatus may include a processor and a memory. The processor is configured to support the apparatus in performing a corresponding function in the method according to the first aspect. The memory is configured to couple to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a sending module, a receiving module, and a determining module. The sending module is configured to send a first message to an access network device. The first message is used for requesting to resume an RRC connection or requesting to perform a radio access network-based notification area update (RNAU). The receiving module is configured to receive a second message from the access network device. The second message includes first information. The first information is related to a security verification parameter. The security verification parameter includes a cell radio network temporary identifier (C-RNTI). The determining module is configured to determine the security verification parameter based on the first information.

In a possible design, the first information indicates whether the security verification parameter needs to be changed, and the determining module is specifically configured to determine, depending on whether the first information is received, whether the security verification parameter needs to be changed, or determine, based on content of the first information, whether the security verification parameter needs to be changed.

In a possible design, the first information indicates the security verification parameter, and the determining module is specifically configured to determine the security verification parameter depending on whether the first information is received, or determine the security verification parameter based on content of the first information.

In a possible design, the sending module is specifically configured to in a first status, send the first message to the access network device, where the first status indicates that a context of the terminal is retained on both the terminal and an access network side when uplink synchronization may not be maintained between the terminal and the access network side.

For limitations on the security verification parameter and the second message, refer to the method descriptions. Details are not described herein again.

According to a second aspect, this application provides a communication method and a communications apparatus.

In a possible design, the method may include: A first access network device receives a first message from a terminal in a first status. The first message is used for requesting to resume a radio resource control (RRC) connection or requesting to perform a radio access network-based notification area update (RNAU), and the first status indicates that a context of the terminal is retained on both the terminal and an access network side when uplink synchronization may not be maintained between the terminal and the access network side. The first access network device sends a second message to the terminal.

In a possible design, the second message includes first information, the first information is related to a security verification parameter, and the security verification parameter includes a cell radio network temporary identifier (C-RNTI). In this method, in an RNAU process, a new serving access network device of the terminal sends indication information to the terminal, to indicate whether an anchor access network device is changed on the network side, helping the terminal determine the security verification parameter. This may ensure that an input parameter of a security parameter carried in the message of the terminal for requesting to resume the RRC connection or requesting to perform the RNAU is consistent with a security verification parameter stored by the access network device, so that security verification succeeds in the RNAU process.

In a possible design, the first information indicates whether the security verification parameter needs to be changed, or the first information indicates the security verification parameter.

In a possible design, the first access network device sends a first request message to a second access network device. The second access network device is an anchor access network device of the terminal, the first request message is used by the first access network device to request a context of the terminal from the second access network device, the first request message includes first indication information, and the first indication information is used to indicate that the terminal requests the RNAU, requests to resume the RRC connection, sends uplink data, or sends uplink signaling. The first access network device receives a first feedback message from the second access network device, and determines, based on the first feedback message, whether the context of the terminal is transferred. In this implementation, the new serving access network device determines, based on the message sent by the anchor access network device, whether the context of the terminal is transferred, so that the new serving access network device may send indication information to the terminal to indicate whether the anchor access network device is changed on the network side.

In a possible design, the first request message is a retrieve user equipment (UE) context request message, and the first feedback message is a retrieve UE context feedback message.

In a possible design, the first request message includes a security verification parameter allocated by the first access network device for the terminal.

In a possible design, if the first access network device determines, after sending the second message to the terminal, that the second message is not correctly received by the terminal, the first access network device sends failure indication information to the second access network device. The failure indication information is used to indicate that the second message is not correctly received by the terminal. In this way, the second access network device may know whether the terminal correctly receives the second message.

In a possible design, the first feedback message includes a security verification parameter allocated by the second access network device to the terminal.

In a possible design, the first access network device determines, based on second indication information in the first feedback message, whether the context of the terminal is transferred. The second indication information is used to indicate whether the context of the terminal is transferred.

In a possible design, the first access network device determines, depending on whether the first feedback message includes data radio bearer (DRB) configuration information corresponding to the terminal, whether the context of the terminal is transferred. In this implementation, if the anchor access network device determines that the anchor access network device is not changed, the feedback message sent to the new serving access network device does not include the DRB configuration information.

In a possible design, after learning, based on the first feedback message, that the first access network device fails to obtain the context of the terminal, the first access network device determines that the context of the terminal is not transferred.

In a possible design, after the first access network device receives the first feedback message from the second access network device, the first access network device receives a Packet Data Convergence Protocol (PDCP) data packet from the second access network device. The PDCP data packet is a PDCP data packet corresponding to the terminal, and a third message included in the PDCP data packet corresponding to the terminal is the same as the second message. In this implementation, the anchor access network device generates related signaling at an RRC layer, generates the PDCP data packet at a PDCP layer, and sends the PDCP data packet to the new serving access network device by using the third message. After the new serving access network device receives the PDCP data packet, the received PDCP data packet does not need to be processed at the PDCP layer, and the PDCP data packet is directly sent to the terminal by using the second message. In this way, the second message may be used to notify the terminal of an RNAU process result and configuration information of the terminal from the network side, so that the RNAU succeeds.

In a possible design, before that the first access network device receives a PDCP data packet from the second access network device, the first access network device sends address information to the second access network device. The address information is used by the second access network device to send the PDCP data packet to the first access network device. In this implementation, the new serving access network device notifies the anchor access network device of a destination address of the sent PDCP data packet.

In a possible design, the security verification parameter further includes a physical cell identifier PCI.

In a possible design, the second message includes an RRC release message, an RRC reject message, an RRC connection release message, or an RRC connection reject message.

Correspondingly, this application further provides a communications apparatus, and the apparatus can implement the communication method in the second aspect. For example, the apparatus may be an access network device or a chip applied to an access network device, or may be another apparatus that can implement the foregoing communication method. The apparatus may implement the foregoing method by using software, hardware, or hardware executing corresponding software.

In a possible design, the apparatus may include a processor and a memory. The processor is configured to support the apparatus in performing a corresponding function in the method according to the second aspect. The memory is configured to couple to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a receiving module and a sending module. The receiving module is configured to receive a first message from a terminal in a first status. The first message is used for requesting to resume an RRC connection or requesting to perform a radio access network-based notification area update (RNAU), and the first status indicates that a context of the terminal is retained on both the terminal and an access network side when uplink synchronization may not be maintained between the terminal and the access network side. The sending module is configured to send a second message to the terminal.

In a possible design, the second message includes first information, the first information is related to a security verification parameter, and the security verification parameter includes a cell radio network temporary identifier (C-RNTI).

In a possible design, the first information indicates whether the security verification parameter needs to be changed, or the first information indicates the security verification parameter.

In a possible design, the apparatus may further include a determining module. The sending module is further configured to send a first request message to a second access network device. The second access network device is an anchor access network device of the terminal, the first request message is used by a first access network device to request a context of the terminal from the second access network device, the first request message includes first indication information, and the first indication information is used to indicate that the terminal requests the RNAU, requests to resume the RRC connection, sends uplink data, or sends uplink signaling. The receiving module is further configured to receive a first feedback message from the second access network device. The determining module is configured to determine, based on the first feedback message, whether the context of the terminal is transferred.

In a possible design, the first request message includes a security verification parameter allocated by the first access network device for the terminal.

In a possible design, the determining module is further configured to determine whether the second message is correctly received by the terminal. If the determining module determines that the second message is not correctly received by the terminal, the sending module is further configured to send failure indication information to the second access network device. The failure indication information is used to indicate that the second message is not correctly received by the terminal.

In a possible design, the first feedback message includes a security verification parameter allocated by the second access network device to the terminal.

In a possible design, the determining module is specifically configured to determine, based on second indication information in the first feedback message, whether the context of the terminal is transferred. The second indication information is used to indicate whether the context of the terminal is transferred.

In a possible design, the determining module is specifically configured to determine, depending on whether the first feedback message includes data radio bearer DRB configuration information corresponding to the terminal, whether the context of the terminal is transferred.

In a possible design, the determining module is specifically configured to determine, after learning, based on the first feedback message, that the first access network device fails to obtain the context of the terminal, that the context of the terminal is not transferred.

In a possible design, the receiving module is further configured to receive a PDCP data packet from the second access network device. The PDCP data packet is a PDCP data packet corresponding to the terminal, and a third message included in the PDCP data packet corresponding to the terminal is the same as the second message.

In a possible design, the sending module is further configured to send address information to the second access network device. The address information is used by the second access network device to send the PDCP data packet to the first access network device.

In a possible design, the security verification parameter further includes a physical cell identifier PCI.

In a possible design, the second message includes an RRC release message, an RRC reject message, an RRC connection release message, or an RRC connection reject message.

According to a third aspect, this application provides a communication method and a communications apparatus.

In a possible design, the method may include A second access network device receives a first request message from a first access network device. The first access network device is a new serving access network device of a terminal, the second access network device is an anchor access network device of the terminal, the first request message is used by the first access network device to request a context of the terminal from the second access network device, the first request message includes first indication information, the first indication information is used to indicate that the terminal requests an RNAU, requests to resume an RRC connection, sends uplink data, or sends uplink signaling, and the first status indicates that the context of the terminal is retained on both the terminal and an access network side when uplink synchronization may not be maintained between the terminal and the access network side. The second access network device sends a first feedback message to the first access network device. The first feedback message is used by the first access network device to determine whether the context of the terminal is transferred. In this method, the anchor access network device determines whether the anchor access network device is changed, and notifies the new serving access network device, so that the new serving access network device may notify the terminal of whether the anchor access network device is changed on the network side. In this way, the terminal may select, depending on whether the anchor access network device is changed on the network side, a security verification parameter consistent with the access network device, to generate a security parameter, and successfully perform security verification.

In a possible design, the first request message is a retrieve UE context request message, and the first feedback message is a retrieve UE context feedback message.

In a possible design, the first request message includes a security verification parameter allocated by the first access network device for the terminal.

In a possible design, if the second access network device determines that the anchor access network device is changed, the first feedback message includes a security verification parameter allocated by the second access network device to the terminal.

In a possible design, the first feedback message is used by the first access network device to determine, based on second indication information in the first feedback message, whether the context of the terminal is transferred. The second indication information is used to indicate whether the context of the terminal is transferred.

In a possible design, the first feedback message is used by the first access network device to determine, depending on whether the first feedback message includes data radio bearer DRB configuration information corresponding to the terminal, whether the context of the terminal is transferred. In this implementation, if the anchor access network device determines that the anchor access network device is not changed, the feedback message sent to the new serving access network device does not include the DRB configuration information.

In a possible design, the first feedback message is used by the first access network device to determine, after learning, based on the first feedback message, that the first access network device fails to obtain the context of the terminal, that the context of the terminal is not transferred.

In a possible design, after that the second access network device sends a first feedback message to the first access network device, the second access network device receives address information from the first access network device. The address information is used by the second access network device to send a PDCP data packet corresponding to the terminal to the first access network device. The second access network device sends the PDCP data packet to the first access network device. In this implementation, the anchor access network device generates related signaling at an RRC layer, generates the PDCP data packet at a PDCP layer, and sends the PDCP data packet to the new serving access network device by using the third message. After the new serving access network device receives the PDCP data packet, the received PDCP data packet does not need to be processed at a PDCP layer, and the PDCP data packet is directly sent to the terminal by using a second message. In this way, the new serving access network device may notify, by using the second message, the terminal of an RNAU process result and configuration information of the terminal from the network side, so that the RNAU succeeds.

In a possible design, the first request message further includes a security verification parameter allocated by the first access network device for the terminal.

In a possible design, the second access network device receives failure indication information from the first access network device. The failure indication information is used to indicate that the second message is not correctly received by the terminal, and the second message is sent by the first access network device to the terminal. The second access network device updates a stored security verification parameter to a security verification parameter allocated by the second access network device to the terminal. In this way, after the terminal fails to receive the second message, the second access network device may use the security verification parameter allocated by the second access network device to the terminal as a security verification parameter used for security verification in a next RNAU. If the security verification parameter is consistent with a security verification parameter reported by the terminal, this ensures that security verification succeeds in the next RNAU.

Correspondingly, this application further provides a communications apparatus, and the apparatus can implement the communication method in the third aspect. For example, the apparatus may be an access network device or a chip applied to an access network device, or may be another apparatus that can implement the foregoing communication method. The apparatus may implement the foregoing method by using software, hardware, or hardware executing corresponding software.

In a possible design, the apparatus may include a processor and a memory. The processor is configured to support the apparatus in performing a corresponding function in the method according to the third aspect. The memory is configured to couple to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a receiving module and a sending module. In a possible design, the receiving module is configured to receive a first request message from a first access network device. The first access network device is a new serving access network device of a terminal, a second access network device is an anchor access network device of the terminal, the first request message is used by the first access network device to request a context of the terminal from the second access network device, the first request message includes first indication information, the first indication information is used to indicate that the terminal requests an RNAU, requests to resume an RRC connection, sends uplink data, or sends uplink signaling, and the first status indicates that the context of the terminal is retained on both the terminal and an access network side when uplink synchronization may not be maintained between the terminal and the access network side. The sending module is configured to send a first feedback message to the first access network device. The first feedback message is used by the first access network device to determine whether the context of the terminal is transferred.

In a possible design, if the second access network device determines that the anchor access network device is changed, the first feedback message includes a security verification parameter allocated by the second access network device to the terminal.

In a possible design, the first feedback message is used by the first access network device to determine, based on second indication information in the first feedback message, whether the context of the terminal is transferred. The second indication information is used to indicate whether the context of the terminal is transferred.

In a possible design, the first feedback message is used by the first access network device to determine, depending on whether the first feedback message includes DRB configuration information corresponding to the terminal, whether the context of the terminal is transferred.

In a possible design, the first feedback message is used by the first access network device to determine, after learning, based on the first feedback message, that the first access network device fails to obtain the context of the terminal, that the context of the terminal is not transferred.

In a possible design, the receiving module is further configured to receive address information from the first access network device. The address information is used by the second access network device to send a PDCP data packet corresponding to the terminal to the first access network device. The sending module is further configured to send the PDCP data packet to the first access network device.

In a possible design, the first request message further includes a security verification parameter allocated by the first access network device for the terminal.

In a possible design, the receiving module is further configured to receive failure indication information from the first access network device. The failure indication information is used to indicate that the second message is not correctly received by the terminal, and the second message is sent by the first access network device to the terminal. The receiving module is further configured to update a stored security verification parameter to a security verification parameter allocated by the second access network device to the terminal.

According to a fourth aspect, this application provides a communication method and a communications apparatus.

In a possible design, the method may include sending a first message to an access network device, where the first message is used for requesting to resume an RRC connection or requesting to perform an RNAU, the access network device is a new serving access network device of a terminal, the first message includes a security parameter, the security parameter is generated by using a security verification parameter as an input parameter, the security verification parameter includes a cell radio network temporary identifier (C-RNTI), and the security verification parameter is allocated by a serving access network device to the terminal in a previous RNAU process of the RNAU process of the terminal, and receiving a second message from the access network device, where the second message is a response message of the first message.

Correspondingly, this application further provides a communications apparatus, and the apparatus can implement the communication method in the fourth aspect. For example, the apparatus may be a terminal or a chip applied to a terminal, or may be another apparatus that can implement the foregoing communication method. The apparatus may implement the foregoing method by using software, hardware, or hardware executing corresponding software.

In a possible design, the apparatus may include a processor and a memory. The processor is configured to support the apparatus in performing a corresponding function in the method according to the fourth aspect. The memory is configured to couple to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a sending module and a receiving module. The sending module is configured to send a first message to an access network device. The first message is used for requesting to resume an RRC connection or requesting to perform an RNAU, the access network device is a new serving access network device of a terminal, the first message includes a security parameter, the security parameter is generated by using a security verification parameter as an input parameter, the security verification parameter includes a cell radio network temporary identifier (C-RNTI), and the security verification parameter is allocated by a serving access network device to the terminal in a previous RNAU process of the RNAU process of the terminal. The receiving module is configured to receive a second message from the access network device. The second message is a response message of the first message.

According to a fifth aspect, this application provides a communication method and a communications apparatus.

In a possible design, the method may include sending a first message to an access network device, where the first message is used for requesting to resume an RRC connection or requesting to perform an RNAU, the access network device is a new serving access network device of a terminal, the first message includes a security parameter, the security parameter is generated by using a security verification parameter as an input parameter, the security verification parameter includes a cell radio network temporary identifier (C-RNTI), and the security verification parameter is allocated by an anchor access network device to the terminal in a previous RNAU process of the RNAU process of the terminal, and receiving a second message from the access network device, where the second message is a response message of the first message.

Correspondingly, this application further provides a communications apparatus, and the apparatus can implement the communication method in the fifth aspect. For example, the apparatus may be a terminal or a chip applied to a terminal, or may be another apparatus that can implement the foregoing communication method. The apparatus may implement the foregoing method by using software, hardware, or hardware executing corresponding software.

In a possible design, the apparatus may include a processor and a memory. The processor is configured to support the apparatus in performing a corresponding function in the method according to the fifth aspect. The memory is configured to couple to the processor, and store a program instruction and data that are necessary for the apparatus. In addition, the apparatus may further include a communications interface, configured to support communication between the apparatus and another apparatus. The communications interface may be a transceiver or a transceiver circuit.

In a possible design, the apparatus may include a sending module and a receiving module. The sending module is configured to send a first message to an access network device. The first message is used for requesting to resume an RRC connection or requesting to perform an RNAU, the access network device is a new serving access network device of a terminal, the first message includes a security parameter, the security parameter is generated by using a security verification parameter as an input parameter, the security verification parameter includes a cell radio network temporary identifier (C-RNTI), and the security verification parameter is allocated by an anchor access network device to the terminal in a previous RNAU process of the RNAU process of the terminal. The receiving module is configured to receive a second message from the access network device. The second message is a response message of the first message.

This application further provides a computer-readable storage medium. The computer-readable storage medium stores an instruction. When the instruction is run on a computer, the computer is enabled to perform the method according to any one of the foregoing aspects.

This application further provides a computer program product including an instruction. When the computer program product is run on a computer, the computer is enabled to perform the method according to any one of the foregoing aspects.

This application further provides a chip system. The chip system includes a processor and may further include a memory, and is configured to implement the method according to any one of the foregoing aspects.

This application provides a communications system, including the foregoing apparatus configured to implement the method according to the first aspect, the fourth aspect, or the fifth aspect, the foregoing apparatus configured to implement the method according to the second aspect, and the foregoing apparatus configured to implement the method according to the third aspect.

Any apparatus, computer storage medium, computer program product, chip system, or communications system provided above is configured to perform the corresponding method provided above. Therefore, for beneficial effects that can be achieved by the apparatus, computer storage medium, computer program product, chip system, or communications system provided above, refer to beneficial effects of a corresponding solution in the corresponding method provided above. Details are not described herein again.

BRIEF DESCRIPTION OF THE DRAWINGS

FIG. 4-1A and FIG. 4-1B are a second schematic diagram of a communication method according to an embodiment of this application;

DETAILED DESCRIPTION OF ILLUSTRATIVE EMBODIMENTS

The following describes in detail a communication method, communications apparatus, and communications system provided in embodiments of this application with reference to the accompanying drawings.

Technical solutions provided in this application may be applied to various communications systems, for example, a 5G new radio (NR) system, a future evolved system, or a plurality of types of convergent communications systems. The technical solutions may be applied to a plurality of types of application scenarios such as a machine to machine (Machine to Machine, M2M) scenario, a D2M scenario, a macro-micro communication scenario, an enhanced mobile broadband (eMBB) scenario, an ultra-reliability low-latency communication (URLLC) scenario, and a massive machine-type communications (mMTC) scenario. These scenarios may include but are not limited to a scenario of communication between UEs, a scenario of communication between network devices, a scenario of communication between a network device and UE, and the like.

Figure 1:
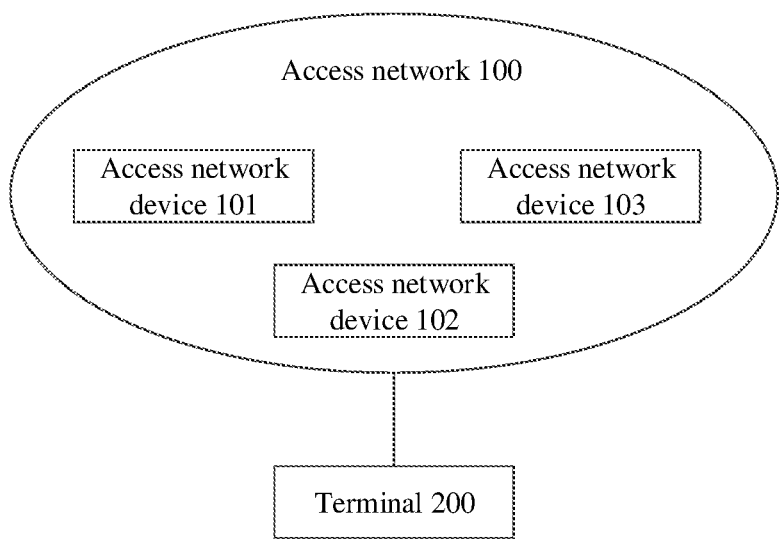
FIG. 1 is a first schematic diagram of a system architecture to which a technical solution according to an embodiment of this application is applicable.

The technical solutions provided in the embodiments of this application may be applied to a system architecture shown in FIG. 1. The communications system may include an access network 100 and a terminal 200.

The access network 100 includes an access network device 101, an access network device 102, and an access network device 103.

The access network device is mainly configured to provide an access service for the terminal 200, for example, implement functions such as a radio physical control function, resource scheduling and radio resource management, radio access control, and mobility management. The access network device may be a device in a radio access network (RAN), for example, a NodeB (NB), an evolved NodeB (evolutional NodeB, eNB), or a 5G-AN/5G-RAN node. The 5G-AN/5G-RAN node may be an access node, a next generation NodeB (gNB), a transmission reception point (TRP), a transmission point (TP), or another access node. Specifically, the access network device corresponds to a service coverage area, and a terminal entering the area may communicate with the access network device via a radio signal, to receive a wireless access service provided by the access network device. The access network device 101, the access network device 102, and the access network device 103 may be access network devices of a same type. For example, the access network device 101, the access network device 102, and the access network device 103 are all gNBs. The access network device 101, the access network device 102, and the access network device 103 may alternatively be access network devices of different types. For example, the access network device 101 and the access network device 102 are gNBs, and the access network device 103 is an eNB. This is not limited in this application.

A connection may be established between access network devices, and the terminal 200 may be connected to the access network device 101, the access network device 102, or the access network device 103 through a wireless air interface.

The terminal 200 may be an access terminal, a user equipment (UE) unit, a UE station, a mobile station, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal in a 5G network, a terminal in a future evolved public land mobile network (PLMN) network, or the like.

It should be noted that the system architecture shown in FIG. 1 is merely used as an example, and is not intended to limit the technical solutions of this application. A person skilled in the art should understand that, in a specific implementation process, the system architecture may further include another device such as a core network device, and a quantity of access network devices and a quantity of terminals may also be configured based on a specific requirement.

The communication method and communications apparatus provided in the embodiments of this application can be applied to a terminal, and the terminal includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, in the embodiments of this application, a specific structure of an execution body of the communication method is not particularly limited in the embodiments of this application, provided that a program that records code of the communication method in the embodiments of this application can be run to perform communication according to the communication method in the embodiments of this application. For example, the execution body of the communication method in the embodiments of this application may be a terminal, a function module that is in a terminal and can invoke and execute the program, or a communications apparatus applied to a terminal, for example, a chip. This is not limited in this application.

Figure 2:
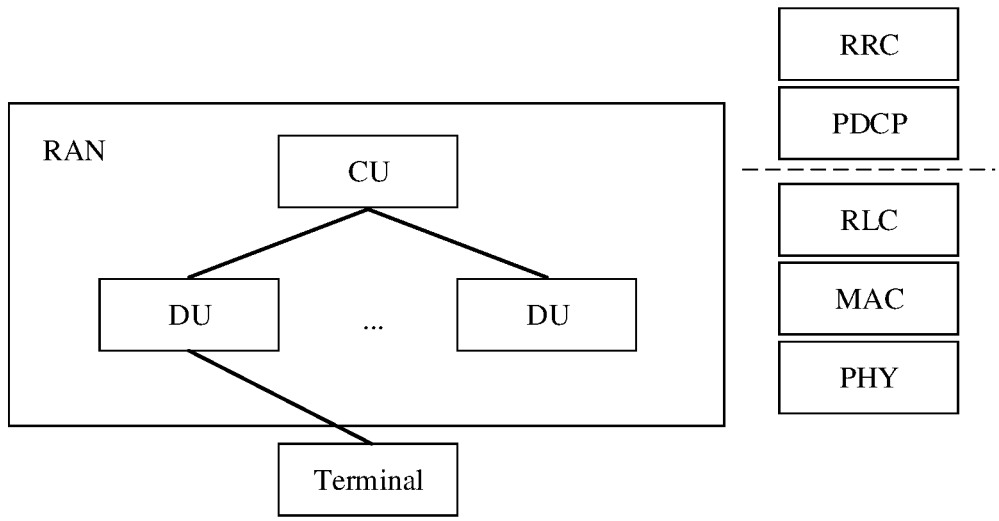
FIG. 2 is a second schematic diagram of a system architecture to which a technical solution according to an embodiment of this application is applicable.

In an example, an architecture and a function of a protocol stack of a conventional base station are divided into two parts. One part is referred to as a central unit (CU), and the other part is referred to as a distributed unit (DU). Actual deployment manners of the CU and the DU are relatively flexible. For example, CUs of a plurality of base stations are integrated to form a function entity with a relatively large scale. FIG. 2 is a schematic diagram of a network architecture according to an embodiment of this application. As shown in FIG. 2, the network architecture includes an access network (where a radio access network (RAN) is used as an example) device and a terminal. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus may be remotely implemented and a remaining part of the radio frequency apparatus is integrated into the baseband apparatus. For example, a gNB includes a baseband apparatus and a radio frequency apparatus. The radio frequency apparatus may be remotely arranged relative to the baseband apparatus (where for example, a radio remote unit (Radio Remote Unit, RRU) is remotely arranged relative to a baseband unit (BBU)). The RAN device is implemented by one node, and the node is configured to implement functions of protocol layers such as a radio resource control (Radio Resource Control, RRC) layer, a packet data convergence protocol (PDCP) layer, a radio link control (RLC) layer, and a media access control (MAC) layer. For another example, in an evolved structure, a baseband apparatus may include a centralized unit (CU) and a distributed unit (DU), and a plurality of DUs may be centrally controlled by one CU. As shown in FIG. 2, the CU and the DU may be divided based on a protocol layer of a wireless network. For example, functions of the PDCP layer and a layer above the PDCP layer are set on the CU, and functions of protocol layers below the PDCP, such as the RLC layer and the MAC layer, are set on the DU.

Division based on the protocol layer is merely an example, and division may alternatively be performed based on another protocol layer, for example, the RLC layer. Functions of the RLC layer and a layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, division may alternatively be performed in another manner, for example, the division is performed based on a latency. A function whose processing time needs to meet a latency requirement is set on the DU, and a function whose processing time does not need to meet the latency requirement is set on the CU.

In addition, the radio frequency apparatus may not be placed in the DU but is placed remotely from the DU, or may be integrated into the DU, or a part of the radio frequency apparatus is remotely implemented and a remaining part of the radio frequency apparatus is integrated into the DU. This is not limited herein.

Figure 3:
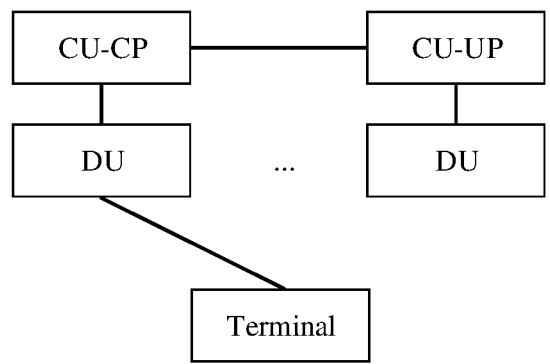
FIG. 3 is a third schematic diagram of a system architecture to which a technical solution according to an embodiment of this application is applicable.

In addition, still referring to FIG. 3, compared with the architecture shown in FIG. 2, in the architecture, a control plane (CP) and a user plane (UP) of the CU may alternatively be separated and implemented by dividing the CU into different entities, which are respectively a control plane CU entity (a CU-CP entity) and a user plane CU entity (a CU-UP entity).

In the foregoing network architecture, signaling/data generated by the CU may be sent to the terminal through the DU, or signaling/data generated by the terminal may be sent to the CU through the DU. The DU may not parse the signaling/data, but directly encapsulate the signaling/data by using a protocol layer and transparently transmits the signaling/data to the terminal or the CU. In the following embodiments, if transmission of such signaling/data between the DU and the terminal is involved, sending or receiving of the signaling/data by the DU includes this scenario. For example, signaling of an RRC layer or of a PDCP layer is finally processed as signaling/data of a physical layer (PHY) and sent to the terminal, or is converted from received signaling/data of a PHY layer. In this architecture, it may also be considered that the signaling/data of the RRC layer or of the PDCP layer is sent by the DU, or is sent by the DU and the radio frequency apparatus.

In the foregoing embodiment, the CU is divided into a network device in the RAN. In addition, the CU may alternatively be divided into a network device in a core network. This is not limited herein. The network architectures shown in FIG. 2 and FIG. 3 may be applied to a 5G communications system, and may alternatively share one or more parts or resources with an LTE system.

An apparatus in the following embodiments of this application may be located in a terminal or an access network device based on a function implemented by the apparatus. When the foregoing CU-DU structure is used, the access network device may be a CU node, a DU node, or a RAN device including functions of a CU node and a DU node. For example, the access network device 101, the access network device 102, and the access network device 103 in FIG. 1 each may be a CU node, DU node, or RAN device including functions of a CU node and a DU node in FIG. 2 or FIG. 3.

In this application, the communication method may be performed by an access network device and a terminal, or may be performed by an apparatus applied to an access network device and a terminal, for example, a chip, or another apparatus implementing the communication method. This is not limited in the embodiments of this application. This specification is described by using an example in which an access network device and a terminal perform the communication method.

The following explains some terms in this application.

1: First Status

The first status has the following characteristic. A context of a terminal is retained on both the terminal and an access network side when uplink synchronization may not be maintained between the terminal and the access network side.

It may be understood that when the terminal switches from the first status to an RRC connected state, a link, such as an NG2 link, between an anchor base station and a control plane network element of a core network does not need to be reactivated. For example, the first status may be a newly defined state in 5G, an RRC inactive state.

It should be noted that, in the embodiments of this application, an example in which the first status is an RRC inactive state is used for description. In actual use, the first status may alternatively have another name. This is not limited in this application. The first status is different from an RRC active state and an RRC idle state.

2: Security Verification Parameter

When performing an RNAU in the RRC inactive state, a terminal includes a security parameter such as a MAC-I or a short MAC-I in a message for requesting to resume an RRC connection or requesting to perform the RNAU. The security parameter is generated by using the security verification parameter as an input parameter. In other words, the input parameter of the security parameter is the security verification parameter. After receiving the security parameter, if an access network device determines that a security verification parameter stored on an access network device side is consistent with the input parameter of the security parameter received from the terminal, the security verification succeeds. Otherwise, the security verification fails. For example, input parameters (namely, security verification parameters) of the security parameter MAC-I may include a cell radio network temporary identifier (C-RNTI), and may further include at least one of a physical cell identifier (PCI) and a target cell identifier (T-Cell ID). After generating the MAC-I based on the C-RNTI, the PCI, and the T-Cell ID, the terminal includes the MAC-I in the message for requesting to resume the RRC connection or requesting to perform the RNAU. After receiving the MAC-I, the access network device respectively verifies the C-RNTI, the PCI, and the T-Cell ID that correspond to the received MAC-I with a C-RNTI, a PCI, and a T-Cell ID that are stored by the access network device. If the input parameters of the received MAC-I are consistent with the C-RNTI, the PCI, and the T-Cell ID that are stored by the access network device, the security verification succeeds.

3: RNA

A RAN-based notification area (RAN based Notification Area, RNA) may include one or more cells. The plurality of cells may belong to an access network device, or may belong to a plurality of access network devices. Access network devices in an RNA may be access network devices of a same type, or may be access network devices of different types. For example, all access network devices in an RNA may be gNBs, or access network devices in an RNA may include an eNB and a gNB.

When a terminal in the RRC inactive state moves inside the RNA, a network side may not be notified, and only terminal-based mobility, for example, cell reselection, is performed, and if the terminal moves to a cell outside the RNA, the network side needs to be notified to perform a location update operation, for example, an RNAU.

4: Anchor Access Network Device and New Serving Access Network Device

The anchor access network device is an access network device that retains a context of a terminal, and there is a control plane link of the terminal between the anchor access network device and a core network (where for example, when needing to send signaling to the terminal in the RRC inactive state, the core network sends a signaling packet to the anchor access network device). For example, the anchor access network device may be a last serving access network device (a last serving node) of the terminal. The new serving access network device is described relative to the anchor access network device, and is an access network device in a moving process of the terminal, where downlink synchronization is maintained between the access network and the terminal or synchronization is maintained between a cell of the access network device and the terminal after the terminal enters the first status. The terminal receives a broadcast signal from the new serving access network device, and may receive signaling from the new serving access network device through an air interface.

"A plurality of" in this application refers to two or more than two. In this specification, the terms "first" and "second" are intended to distinguish between different objects but do not indicate a particular order of the objects. For example, first indication information and second indication information are merely used to distinguish between different indication information, and do not limit sequences of the first indication information and the second indication information. The term "and/or" in this specification describes only an association relationship for describing associated objects and represents that three relationships may exist. For example, A and/or B may represent the following three cases: Only A exists, both A and B exist, and only B exists.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "for example", "example", or the like is intended to present a relative concept in a specific manner.

When the terminal in the RRC inactive state performs the RNAU, in some cases, the terminal does not actually move out of the RNA. For example, the terminal in the RRC inactive state performs a periodic RNAU. When the terminal does not move out of the RNA, to reduce signaling overheads, the context may not be transferred between the new serving access network device and the anchor access network device. In some cases, in an RNAU process, the anchor access network device of the terminal is changed. For example, a cell of the new serving access network device to which the terminal belongs is relatively far away from a cell of the anchor access network device, and a distance between the two cells is greater than a preset threshold. The anchor access network device of the terminal determines the new serving access network device of the terminal as a new anchor access network device of the terminal, and the original anchor access network device transfers the context of the terminal to the new anchor access network device.

For example, the terminal 200 in FIG. 1 accesses a network via the access network device 101. The access network device 101 is an anchor access network device of the terminal 200. The access network device 101 allocates a C-RNTI such as a C-RNTI 1 to the terminal 200. In the access network device 101, the terminal 200 switches from an RRC connected state to an RRC inactive state. The terminal 200 moves to the access network device 102, and requests the access network device 102 to resume an RRC connection or to perform an RNAU. The access network device 102 allocates a C-RNTI such as a C-RNTI 2 to the terminal 200. In other words, the terminal 200 obtains two C-RNTIs, the C-RNTI 1 and the C-RNTI 2. The terminal 200 re-initiates an RNAU, and requests the access network device 103 to resume an RRC connection or to perform an RNAU. The message for requesting, by the terminal 200, the access network device 103 to resume the RRC connection or to perform the RNAU includes a MAC-I (or a short MAC-I). The MAC-I (or the short MAC-I) is generated by using a C-RNTI as an input parameter. The terminal 200 needs to select one of the C-RNTI 1 and the C-RNTI 2.

If the anchor access network device is not changed (where the context of the terminal is not transferred) when the terminal 200 moves to the access network device 102, the anchor access network device is the access network device 101. After receiving the message sent by the terminal 200 for requesting to resume the RRC connection or requesting to perform the RNAU, the access network device 103 transmits the MAC-I (or the short MAC-I) in the message to the anchor access network device, namely, the access network device 101, for security verification. If the MAC-I (or the short MAC-I) carried in the message sent by the terminal 200 to the access network device 103 to request to resume the RRC connection or request to perform the RNAU is generated based on the C-RNTI 2 allocated by the access network device 102 to the terminal 200, after receiving the MAC-I (or the short MAC-I), the access network device 103 sends the MAC-I (or the short MAC-I) to the anchor access network device (the access network device 101) for security verification. A C-RNTI of the terminal 200 stored by the access network device 101 is the C-RNTI 1, and the C-RNTI stored by the access network device 101 is inconsistent with the C-RNTI corresponding to the MAC-I (or the short MAC-I) carried in the message for requesting to resume the RRC connection or requesting to perform the RNAU. In this case, the security verification fails.

If the anchor access network device is changed (where the context of the terminal is transferred) when the terminal 200 moves to the access network device 102, the anchor access network device is changed to the access network device 102. After receiving the message sent by the terminal 200 for requesting to resume the RRC connection or requesting to perform the RNAU, the access network device 103 transmits the MAC-I (or the short MAC-I) in the message to the access network device 102 for security verification. If the MAC-I (or the short MAC-I) carried in the message sent by the terminal 200 to the access network device 103 to request to resume the RRC connection or request to perform the RNAU is generated based on the C-RNTI 1 allocated by the access network device 101 to the terminal 200, after receiving the MAC-I (or the short MAC-I), the access network device 103 sends the MAC-I (or the short MAC-I) to the anchor access network device (the access network device 102) for security verification. A C-RNTI of the terminal 200 stored by the access network device 102 is the C-RNTI 2, and the C-RNTI stored by the access network device 102 is inconsistent with the C-RNTI corresponding to the MAC-I (or the short MAC-I) carried in the message for requesting to resume the RRC connection or requesting to perform the RNAU. In this case, the security verification fails.

It may be learned that, if the terminal 200 does not know whether the anchor access network device is changed (whether the context of the terminal is transferred) in the RNAU, when the RNAU is performed again, the security verification parameter corresponding to the security parameter sent to the access network device may be inconsistent with the security verification parameter stored by the anchor access network device. Consequently, the security verification fails.

Embodiment 1

Figure 4:
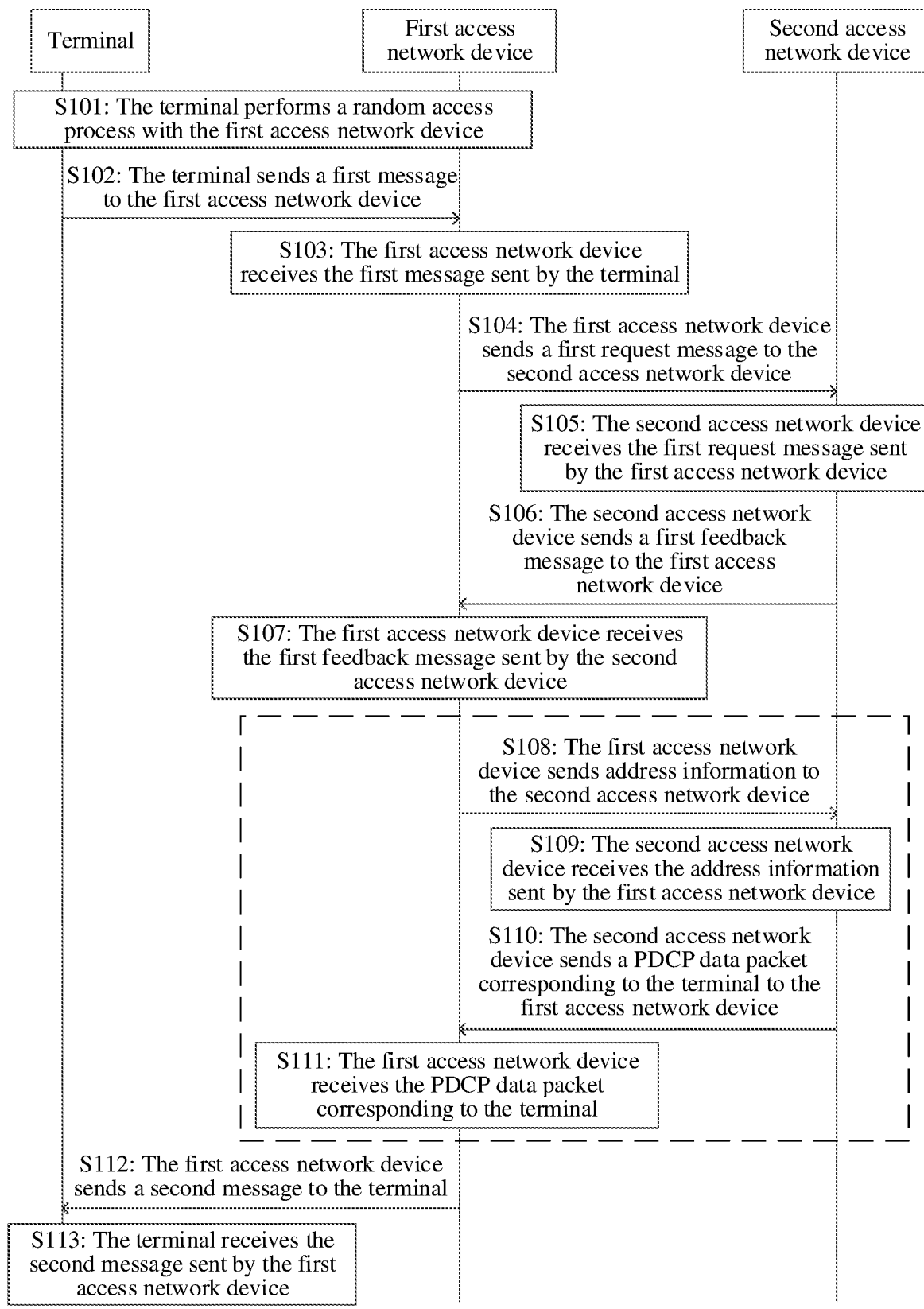
FIG. 4 is a schematic diagram of a communication method according to an embodiment of this application.

This embodiment of this application provides a communication method, which may be applied to the communications system shown in FIG. 1. A terminal selects a security verification parameter according to an indication of an access network device, to ensure that the security verification parameter corresponding to a security parameter sent by the terminal to the access network device is consistent with a security verification parameter used by the access network device for security verification. As shown in FIG. 4, the method may includS101 to S113.

S101: The terminal performs a random access process with a first access network device.

For example, the terminal is the terminal 200 in FIG. 1, the terminal 200 is in an RRC inactive state, an anchor access network device of the terminal 200 is the access network device 101 in FIG. 1, and the terminal obtains a security verification parameter allocated by the anchor access network device to the terminal, for example, a C-RNTI such as a C-RNTI 1. Then, the terminal 200 moves to the first access network device, and initiates an RNAU. The first access network device is a new serving access network device of the RNAU of the terminal. For example, the first access network device is the access network device 102 in FIG. 1.

Optionally, in this embodiment of this application, for example, the random access process performed by the terminal with the first access network device may include two steps. (1) The terminal sends a random access preamble to the access network device. (2) The access network device sends a random access response message to the terminal. Through the random access process, the terminal obtains a security verification parameter, such as a C-RNTI 2, allocated by the first access network device for the terminal.

It should be noted that this embodiment of this application is described by using an example in which the security verification parameter is a C-RNTI. During actual application, the security verification parameter may be any parameter used for security verification. For example, the security verification parameter includes a C-RNTI and a physical cell identifier (Physical Cell Id, PCI). This is not limited in this application.

S102: The terminal sends a first message to the first access network device.

Specifically, the terminal sends the first message to the first access network device. The first message is used for requesting to resume an RRC connection, requesting to perform the RNAU, requesting to send uplink data, or requesting to send uplink signaling. For example, the terminal 200 sends the first message to the access network device 102, to request to resume an RRC connection, request to perform the RNAU, request to send uplink data, or request to send uplink signaling. In an implementation, the first message may be an RRC resume request (RRC Resume Request) message or an RRC connection resume request (RRC Connection Resume Request) message. The first message includes a security parameter such as a MAC-I or a short MAC-I. The security parameter is generated by using the security verification parameter as an input parameter. For example, an RRC resume request message sent by the terminal 200 to the access network device 102 includes a short MAC-I. The short MAC-I is generated by using the C-RNTI 1 as an input parameter. For example, the C-RNTI 1 may be allocated by the access network device 101 to the terminal 200 in a process in which the terminal 200 requests to perform random access to the anchor access network device (the access network device 101 in FIG. 1).

In an implementation, the RRC resume request message (or the RRC connection resume request message) includes a first cause value, and the first cause value is used to indicate a cause for initiating the RRC resume request message (or the RRC connection resume request message). For example, if the terminal determines that a periodic RNAU is requested, and sends an RRC resume request message to the first access network device, the first cause value is the RNAU.

S103: The first access network device receives the first message sent by the terminal.

S104: The first access network device sends a first request message to a second access network device.

The second access network device is an anchor access network device of the terminal. For example, the second access network device is the access network device 101 in FIG. 1.

The first access network device sends the first request message to the second access network device. The first request message is used by the first access network device to request a context of the terminal from the second access network device. For example, the first request message is a retrieve UE context request (Retrieve UE Context Request) message.

In an implementation, the first request message includes first indication information, and the first indication information is used to indicate that the terminal requests the RNAU, requests to resume an RRC connection, requests to send uplink data, or requests to send uplink signaling. In an implementation, the first indication information indicates that the terminal requests a periodic RNAU.

In an implementation, the first request message includes identification information of a current serving cell. The second access network device determines, based on the first indication information and the identification information of the serving cell, whether to transfer the context of the terminal.

The retrieve UE context request message further includes a security parameter received by the first access network device from the terminal. The security parameter is used by the second access network device to perform security verification on the terminal, that is, to verify validity of the terminal.

S105: The second access network device receives the first request message sent by the first access network device.

Specifically, the second access network device determines, based on the first indication information in the first request message, that the terminal requests the RNAU, requests to resume the RRC connection, requests to send the uplink data, or requests to send the uplink signaling.

The second access network device performs security verification based on the security parameter in the first request message. For example, the security verification parameter corresponding to the security parameter in the first request message received by the access network device 101 from the access network device 102 is the C-RNTI 1, and the security verification parameter of the terminal 200 stored by the access network device 101 is the C-RNTI 1. If the C-RNTI 1 corresponding to the security parameter is consistent with the C-RNTI 1 stored by the access network device 101, the security verification succeeds.

Further, the second access network device determines whether to transfer the context of the terminal. It should be noted that the transfer of the context of the terminal in this application may also be expressed as change of the anchor access network device or a path transfer process, and the three expressions may be replaced with each other.

In an implementation, if determining that a current process is a periodic RNAU process, the second access network device determines not to transfer the context of the terminal. In an implementation, when determining that a current process is a periodic RNAU process, the second access network device determines, based on a distance between a cell that is of the second access network device and to which the terminal requests to move and a cell that is of the anchor access network device and on which the terminal is anchored, whether to transfer the context of the terminal. If the distance between the cell that is of the second access network device and to which the terminal requests to move and the cell that is of the anchor access network device and on which the terminal is anchored is greater than a preset threshold, the second access network device determines to transfer the context of the terminal. Otherwise, the second access network device determines not to transfer the context of the terminal. For example, a target cell of a periodic RNAU requested by the terminal 200 is a cell 1 of the first access network device (the access network device 102), and a cell that is of the anchor access network device and on which the terminal 200 is anchored is a cell 2 of the second access network device (the access network device 101). If a distance between the cell 1 of the access network device 102 and the cell 2 of the access network device 101 is greater than the preset threshold, the second access network device determines to change the anchor access network device, and determines the first access network device as a new anchor access network device of the terminal. That is, the context of the terminal is transferred. The original anchor access network device (the second access network device) transfers the context of the terminal to the new anchor access network device (the first access network device). If the distance between the cell 1 of the access network device 102 and the cell 2 of the access network device 101 is less than or equal to the preset threshold, the second access network device determines not to change the anchor access network device. That is, the context of the terminal is not transferred.

A manner in which the second access network device determines whether the current process is a periodic RNAU process may include The first indication information indicates that the terminal requests a periodic RNAU, and the second access network device determines, based on the first indication information, whether the current process is a periodic RNAU process. Alternatively, the second access network device determines, based on the first indication information and the identification information of the current serving cell, whether the current process is a periodic RNAU process. For example, the first indication information indicates that the terminal requests an RNAU, and the second access network device determines, based on the identification information of the current serving cell, that a last RNA allocated to the terminal includes the current serving cell, and then determines that the process is a periodic RNAU process.

S106: The second access network device sends a first feedback message to the first access network device.

Specifically, the first feedback message may be used by the first access network device to determine whether the context of the terminal is transferred. For example, the first feedback message may be a retrieve UE context response message or a retrieve UE context failure message.

In an implementation, the second access network device sends a retrieve UE context response message to the first access network device. The retrieve UE context response message includes second indication information. The second indication information is used to indicate whether the context of the terminal is transferred, used to indicate whether the anchor access network device is changed, used to indicate whether a path transfer process is performed, or used to indicate whether RRC signaling needs to be transferred from the second access network device to the first access network device. For example, the retrieve UE context response message sent by the second access network device to the first access network device includes the second indication information. If the second indication information is 0, it indicates that the context of the terminal is not transferred, and if the second indication information is 1, it indicates that the context of the terminal is transferred. Alternatively, if the second indication information is true (true), it indicates that the context of the terminal is not transferred, and if the second indication information is false (false), it indicates that the context of the terminal is transferred. Alternatively, if the second indication information is null (in other words, the retrieve UE context response message does not include the second indication information), it indicates that the context of the terminal is transferred.

In an implementation, the second access network device sends a retrieve UE context response message to the first access network device. The retrieve UE context response message includes radio bearer (RB) information corresponding to the terminal. The first access network device determines, depending on whether the radio bearer information in the retrieve UE context response message includes data radio bearer (DRB) configuration information corresponding to the terminal, whether the context of the terminal is transferred. Alternatively, the first access network device determines, depending on whether the radio bearer information in the retrieve UE context response message includes signaling radio bearer (SRB) 1 configuration information corresponding to the terminal, whether the context of the terminal is transferred. For example, if the radio bearer information included in the retrieve UE context response message includes only the SRB1 configuration information but does not include the DRB configuration information, it indicates that the context of the terminal is not transferred, and if the retrieve UE context response message includes the SRB1 configuration information of the terminal and the DRB configuration information of the terminal, it indicates that the context of the terminal is transferred.

In an implementation, the SRB1 configuration information included in the retrieve UE context response message may include at least one of an RLC layer configuration by the second access network device for the terminal, a MAC layer configuration by the second access network device for the terminal, a PHY layer configuration by the second access network device for the terminal, and a logical channel configuration by the second access network device for the terminal. The SRB1 configuration information is SRB1 configuration information of the terminal, and is used to notify the first access network device of the SRB1 configuration information currently retained on a terminal side, so that the first access network device configures SRB1 configuration information consistent with the SRB1 configuration information retained on the terminal side.

In an implementation, the second access network device sends a retrieve UE context failure message to the first access network device. The retrieve UE context failure message is used to indicate that the context of the terminal is not transferred. For example, the retrieve UE context failure message includes a second cause value. The second cause value indicates that the context of the terminal is not transferred. For example, the retrieve UE context failure message includes third indication information. The third indication information indicates that the context of the terminal is not transferred.

In an implementation, a retrieve UE context response message may further include a PDCP data packet. The PDCP data packet is a PDCP data packet corresponding to the terminal. In an implementation, the second access network device generates an RRC message at an RRC layer, and performs processing at a PDCP layer of the second access network device, for example, operations such as security encryption and integrity protection, to generate a PDCP data packet. After obtaining the PDCP data packet, the first access network device may process the PDCP data packet only at the RLC layer, the MAC layer, and the PHY layer.

It should be noted that, if the retrieve UE context response message includes a PDCP data packet, this embodiment of this application may not include S108 to Sin. A specific implementation may be determined based on an actual situation. This is not limited in this application.

S107: The first access network device receives the first feedback message sent by the second access network device.

The first access network device determines, based on the first feedback message, whether the context of the terminal is transferred.

In an implementation, if determining that the context of the terminal is transferred, the first access network device determines that the terminal enters an RRC connected state, an RRC inactive state, or an RRC idle state, generates a corresponding RRC message, and sends the RRC message to the terminal.

In an implementation, if determining that the context of the terminal is not transferred, and the first feedback message sent by the second access network device to the first access network device does not include a PDCP data packet, the first access network device determines to set the terminal to be in an RRC inactive state, and sends an RRC connection reject message to the terminal.

It should be noted that the following S108 to S111 are optional steps.

S108: The first access network device sends address information to the second access network device.

Specifically, the address information is used by the second access network device to send a PDCP data packet corresponding to the terminal to the first access network device. For example, the address information is a transport layer address, a tunnel port identifier, or a transport layer address and a tunnel port identifier. In an implementation, the first access network device sends the address information to the second access network device by using a forwarding address indication (Forwarding Address Indication) message.

S109: The second access network device receives the address information sent by the first access network device.

S110: The second access network device sends the PDCP data packet corresponding to the terminal to the first access network device.

The second access network device sends the PDCP data packet corresponding to the terminal to the first access network device based on the address information. In an implementation, the PDCP data packet is a PDCP packet of a third message, and the third message is an RRC message. For example, the second access network device generates the third message at the RRC layer, and processes the third message at the PDCP layer of the second access network device, to generate the PDCP data packet. The third message includes first information, and the first information is related to the security verification parameter.

S111: The first access network device receives the PDCP data packet corresponding to the terminal.

In an implementation, the second access network device generates signaling at the RRC layer, and performs processing at the PDCP layer of the second access network device, for example, operations such as security encryption and integrity protection, to generate the PDCP data packet. For example, the second access network device generates the third message at the RRC layer, and processes the third message at the PDCP layer of the second access network device, to generate the PDCP data packet. After receiving the PDCP data packet, the first access network device may process the PDCP data packet only at the RLC layer, the MAC layer, and the PHY layer.

S112: The first access network device sends a second message to the terminal.

In an implementation, after receiving the PDCP data packet corresponding to the terminal, the first access network device directly processes the PDCP data packet at the RLC layer and a layer below the RLC layer without parsing, and sends the PDCP data packet to the terminal device, that is, sends the second message to the terminal. For example, the second message may include an RRC release (RRC Release) message, an RRC reject (RRC Reject) message, an RRC connection release (RRC Connection Release) message, or an RRC connection reject (RRC Connection Reject) message. In an implementation, the PDCP data packet corresponding to the terminal received by the first access network device includes a third message. The first access network device directly processes the PDCP data packet at the RLC layer and the layer below the RLC layer without parsing the PDCP data packet at the RRC layer, and sends the PDCP data packet to the terminal device, that is, sends the second message to the terminal. The third message included in the PDCP data packet corresponding to the terminal is the same as the second message.

The second message includes first information, and the first information is related to the security verification parameter. That the first information is related to the security verification parameter means that the first information is used to indicate the terminal to determine the security verification parameter. For example, the first information may indicate whether the security verification parameter needs to be changed, the first information indicates the security verification parameter, or the first information indicates an identifier (for example, an inactive RNTI (I-RNTI)) allocated by the second access network device to the terminal in a first status. The terminal may determine, based on the first information, whether the anchor access network device is changed in this RNAU, that is, whether the context of the terminal is transferred. In this way, when an RNAU is initiated again, the terminal determines an input parameter (a security verification parameter) of a security parameter carried in a message for requesting to resume an RRC connection or requesting to perform the RNAU.

In an implementation, if the first access network device does not receive the PDCP data packet corresponding to the terminal sent by the second access network device (where for example, the retrieve UE context response message does not include the PDCP data packet corresponding to the terminal), the second message may be an RRC reject message or an RRC connection reject message, and is used to indicate to the terminal whether the anchor access network device is changed in this RNAU. The RRC reject message or the RRC connection reject message does not include the PDCP data packet corresponding to the terminal. For example, the terminal may determine, depending on whether the RRC reject message or RRC connection reject message includes a wait period, whether the anchor access network device is changed. For example, if the RRC reject message or RRC connection reject message includes the wait period, the terminal considers that the periodic RNAU fails due to congestion. Consequently, the terminal re-initiates an RRC connection resume request after the wait period expires. If the RRC message does not include the wait period, the terminal considers that the periodic RNAU succeeds, but the anchor access network device is not changed on the network side. Therefore, the terminal still stays in the RRC inactive state. In another example, the RRC reject message or RRC connection reject message carries fourth indication information, and the terminal determines, based on the fourth indication information, whether the security verification parameter is updated. For example, the fourth indication information indicates whether the anchor access network device is changed, indicates whether the context of the terminal is transferred, or indicates whether the security verification parameter needs to be changed. For example, the terminal may determine, by setting the wait period in the RRC reject message or RRC connection reject message, whether the anchor access network device is changed. For example, if the wait period included in the RRC reject message or RRC connection reject message is the same as a periodicity of the periodic RNAU, the terminal considers that the periodic RNAU succeeds but the anchor access network device is not changed on the network side. Therefore, the terminal still stays in the RRC inactive state. Otherwise, the terminal considers that the periodic RNAU fails due to congestion. Consequently, the terminal re-initiates an RRC connection resume request after the wait period expires. For another example, if the wait period included in the RRC reject message or RRC connection reject message is set to 0, the terminal considers that the periodic RNAU succeeds but the anchor access network device is not changed on the network side. Therefore, the terminal still stays in the RRC inactive state. Otherwise, the terminal considers that the periodic RNAU fails due to congestion. Consequently, the terminal re-initiates an RRC connection resume request after the wait period expires. For another example, if the wait period included in the RRC reject message or RRC connection reject message is set to infinity, the terminal considers that the periodic RNAU succeeds but the anchor access network device is not changed on the network side. Therefore, the terminal still stays in the RRC inactive state. Otherwise, the terminal considers that the periodic RNAU procedure fails due to congestion. Consequently, the terminal re-initiates an RRC connection resume request after the wait period expires.

S113: The terminal receives the second message sent by the first access network device.

In an implementation, the terminal determines, based on the first information in the second message, whether the anchor access network device is changed in this RNAU, that is, whether the context of the terminal is transferred between the first access network device and the second access network device.

In an implementation, the first information indicates whether the security verification parameter needs to be changed. The terminal determines, depending on whether the first information is received, whether the security verification parameter needs to be changed. For example, if determining that the first information in the second message is null, the terminal determines that the context of the terminal is not transferred between the first access network device and the second access network device, and the security verification parameter is not changed. The terminal retains the C-RNTI 1 allocated by the anchor access network device (the second access network device). When the RNAU is re-initiated, the input parameter of the MAC-I (or the short MAC-I) carried in the message for requesting to resume the RRC connection or requesting to perform the RNAU is the C-RNTI 1. If determining that the first information in the second message is not null, the terminal determines that the context of the terminal is transferred between the first access network device and the second access network device, and the security verification parameter is changed. The terminal replaces the stored C-RNTI with the C-RNTI 2 allocated by the new serving access network device (the first access network device). When the RNAU is re-initiated, the input parameter of the MAC-I (or the short MAC-I) carried in the message for requesting to resume the RRC connection or requesting to perform the RNAU is the C-RNTI 2. It should be noted that, descriptions are provided herein by using an example in which the first information being null indicates that the context of the terminal is not transferred between the first access network device and the second access network device, and the security verification parameter is not changed. During actual application, the first information being null may alternatively indicate that the context of the terminal is transferred between the first access network device and the second access network device, and the security verification parameter is changed. Alternatively, another indication method may be used. This is not limited in this embodiment of this application.

In an implementation, the first information indicates whether the security verification parameter needs to be changed. The terminal determines the security verification parameter based on content of the first information. For example, the first information being 0 indicates that the context of the terminal is not transferred between the first access network device and the second access network device, and the security verification parameter is not changed. The terminal retains the C-RNTI 1 allocated by the anchor access network device (the second access network device). When the RNAU is re-initiated, the input parameter of the MAC-I (or the short MAC-I) carried in the message for requesting to resume the RRC connection or requesting to perform the RNAU is the C-RNTI 1. The first information being 1 indicates that the context of the terminal is transferred between the first access network device and the second access network device, and the security verification parameter is changed. The terminal replaces the stored C-RNTI with the C-RNTI 2 allocated by the new serving access network device (the first access network device). When the RNAU is re-initiated, the input parameter of the MAC-I (or the short MAC-I) carried in the message for requesting to resume the RRC connection or requesting to perform the RNAU is the C-RNTI 2. It should be noted that, descriptions are provided herein by using an example in which the first information being 0 indicates that the context of the terminal is not transferred between the first access network device and the second access network device, and the security verification parameter is not changed. During actual application, the first information being 0 may alternatively indicate that the context of the terminal is transferred between the first access network device and the second access network device, and the security verification parameter is changed. Alternatively, whether the context of the terminal is transferred is indicated by using another value. This is not limited in this embodiment of this application.

In an implementation, the first information indicates the security verification parameter. The terminal determines the security verification parameter depending on whether the first information is received. For example, if determining that the first information in the second message is null, the terminal determines that the context of the terminal is transferred between the first access network device and the second access network device. When re-initiating the RNAU, the terminal generates the security parameter by using the C-RNTI 2 allocated by the new serving access network device (the first access network device). The input parameter of the MAC-I (or the short MAC-I) carried in the message for requesting to resume the RRC connection or requesting to perform the RNAU is the C-RNTI 2. If determining that the first information in the second message is not null, for example, the first information is the C-RNTI 1 allocated by the anchor access network device (the second access network device), the terminal determines that the context of the terminal is not transferred between the first access network device and the second access network device. When re-initiating the RNAU, the terminal generates the security parameter by using the C-RNTI 1 allocated by the anchor access network device (the second access network device). The input parameter of the MAC-I (or short MAC-I) carried in the message for requesting to resume the RRC connection or requesting to perform the RNAU is the C-RNTI 1. In other words, when the terminal re-initiates the RNAU, the input parameter of the MAC-I (or the short MAC-I) carried in the message for requesting to resume the RRC connection or requesting to perform the RNAU is a C-RNTI value of the first information. It should be noted that descriptions are provided herein by using an example in which a valid value of the first information is the C-RNTI allocated by the second access network device. During actual application, the valid value of the first information may alternatively be the C-RNTI allocated by the first access network device. Alternatively, another indication method may be used. This is not limited in this embodiment of this application.

In an implementation, the first information indicates the security verification parameter. The terminal determines the security verification parameter based on content of the first information. For example, when the terminal re-initiates the RNAU, the input parameter of the MAC-I (or the short MAC-I) carried in the message for requesting to resume the RRC connection or requesting to perform the RNAU is a C-RNTI value of the first information. For example, if the first information is the C-RNTI 2 allocated by the new serving access network device (the first access network device), it indicates that the context of the terminal is transferred between the first access network device and the second access network device. When re-initiating the RNAU, the terminal generates the security parameter by using the C-RNTI 2 allocated by the new serving access network device (the first access network device). The input parameter of the MAC-I (or the short MAC-I) carried in the message for requesting to resume the RRC connection or requesting to perform the RNAU is the C-RNTI 2. If the first information is the C-RNTI 1 allocated by the anchor access network device (the second access network device), it indicates that the context of the terminal is not transferred between the first access network device and the second access network device. When re-initiating the RNAU, the terminal generates the security parameter by using the C-RNTI 1 allocated by the anchor access network device (the second access network device). The input parameter of the MAC-I (or the short MAC-I) carried in the message for requesting to resume the RRC connection or requesting to perform the RNAU is the C-RNTI 1. It should be noted that descriptions are provided herein by using an example in which the first information is the C-RNTI 1 or the C-RNTI 2. During actual application, the first information may alternatively be another value. This is not limited in this embodiment of this application.

In an implementation, the first information indicates an I-RNTI allocated by the second access network device to the terminal in the first status. If the I-RNTI included in the second message is the same as an I-RNTI currently retained by the terminal, it indicates that the context of the terminal is not transferred between the first access network device and the second access network device. When re-initiating the RNAU, the terminal generates the security parameter by using the C-RNTI 1 allocated by the anchor access network device (the second access network device). If the I-RNTI included in the second message is different from the I-RNTI currently retained by the terminal, it indicates that the context of the terminal is transferred between the first access network device and the second access network device. When re-initiating the RNAU, the terminal generates the security parameter by using the C-RNTI 2 allocated by the new serving access network device (the first access network device). The input parameter of the MAC-I (or the short MAC-I) carried in the message for requesting to resume the RRC connection or requesting to perform the RNAU is the C-RNTI 2.

In the foregoing implementations, the first access network device indicates, to the terminal by using the first information, whether the context of the terminal is transferred between the first access network device and the second access network device. If the terminal determines that the context of the terminal is transferred between the first access network device and the second access network device, when the terminal re-initiates the RNAU, the input parameter (the security verification parameter) of the security parameter carried in the message for requesting to resume the RRC connection or requesting to perform the RNAU is the security verification parameter allocated by the new serving access network device to the terminal. If the terminal determines that the context of the terminal is not transferred between the first access network device and the second access network device, when the terminal re-initiates the RNAU, the input parameter (the security verification parameter) of the security parameter carried in the message for requesting to resume the RRC connection or requesting to perform the RNAU is the security verification parameter allocated by the anchor access network device to the terminal.

For example, the terminal 200 moves to the access network device 102 by performing the RNAU, and after a preset periodicity, the terminal 200 re-initiates the RNAU. The terminal 200 sends the first message to the access network device 103 to request to resume the RRC connection or request to perform the RNAU. The input parameter of the security parameter carried in the first message sent to the access network device 103 is the security verification parameter determined by the terminal based on the first information received in S113. For example, the terminal 200 determines that the context of the terminal is not transferred in a process in which the terminal 200 moves from the access network device 101 to the access network device 102, and the anchor access network device of the terminal 200 is the access network device 101. The input parameter of the security parameter carried in the first message sent by the terminal 200 to the access network device 103 is the security verification parameter C-RNTI 1 allocated by the anchor access network device (the access network device 101). After receiving the security parameter in the first message, the access network device 103 sends the security parameter reported by the terminal 200, to the anchor access network device (the access network device 101). The access network device 101 performs security verification, and determines that the input parameter C-RNTI 1 of the security parameter reported by the terminal 200 is consistent with the security verification parameter C-RNTI 1 stored by the access network device 101, so that the security verification succeeds. For example, the terminal 200 determines that the context of the terminal is transferred in a process in which the terminal 200 moves from the access network device 101 to the access network device 102, and the anchor access network device of the terminal 200 is changed to the access network device 102. The input parameter of the security parameter carried in the first message sent by the terminal 200 to the access network device 103 is the security verification parameter C-RNTI 2 allocated by the new serving access network device (a new anchor access network device, namely, the access network device 102). After receiving the security parameter in the first message, the access network device 103 sends the security parameter reported by the terminal 200, to the new anchor access network device (the access network device 102). The access network device 102 performs security verification, and determines that the input parameter C-RNTI 2 of the security parameter reported by the terminal 200 is consistent with the security verification parameter C-RNTI 2 stored by the access network device 102, so that the security verification succeeds.

According to the communication method provided in this embodiment of this application, in each RNAU process, the new serving access network device sends indication information to the terminal to indicate whether the context of the terminal is transferred in this RNAU, that is, whether the anchor access network device is changed. The terminal determines, based on the indication information in the process of re-initiating the RNAU, the input parameter of the security parameter carried in the message for requesting to resume the RRC connection or requesting to perform the RNAU. If the anchor access network device is not changed in this RNAU, in a re-initiated RNAU, the input parameter of the security parameter carried in the message for requesting to resume the RRC connection or requesting to perform the RNAU is the security verification parameter allocated by the anchor access network device to the terminal. If the anchor access network device is changed in this RNAU, in a re-initiated RNAU, the input parameter of the security parameter carried in the message for requesting to resume the RRC connection or requesting to perform the RNAU is the security verification parameter allocated by the new anchor access network device (namely, the new serving access network device in this RNAU process) to the terminal. This ensures that in the RNAU, the input parameter (the security verification parameter) of the security parameter reported by the terminal is consistent with the security verification parameter used by the access network device for security verification, so that the security verification succeeds.

Embodiment 2

This embodiment of this application further provides a communication method. In Embodiment 2, a procedure of interaction between a terminal device, a first access network device, and a second access network device is similar to the procedure of interaction between the terminal device, the first access network device, and the second access network device in Embodiment 1. This embodiment of this application is not shown in another figure. A main difference of the method in Embodiment 2 from the method in Embodiment 1 in that implementations of S104, S105, S112, and S113 may be different. S104, S105, S112, and S113 are denoted as $S104'$, $S105'$, $S112'$, and $S113'$ herein.

In $S104'$, a first request message sent by the first access network device to the second access network device may further include a security verification parameter allocated by the first access network device for the terminal. For example, the first request message sent by the access network device 102 to the access network device 101 includes the C-RNTI 2 allocated by the access network device 102 to the terminal 200.

In $S105'$, after receiving the first request message sent by the first access network device, the second access network device may further store the security verification parameter that is carried in the first request message and allocated by the first access network device for the terminal. The security verification parameter is used for security verification in a next RRC connection resume process or next RNAU process of the terminal.

$S112'$: The first access network device sends a second message to the terminal.

It is different from S112 in Embodiment 1 that, in a possible implementation, the second message in $S112'$ in this embodiment may not include first information.

It should be noted that in a possible implementation, $S112'$ may alternatively be the same as S112 in Embodiment 1. This is not limited in this application.

$S113'$: The terminal receives the second message sent by the first access network device.

It is different from S113 in Embodiment 1 that, when the second message does not include the first information, the terminal receives the second message sent by the first access network device, and determines that a status of the terminal is an RRC inactive state. In a process of re-initiating an RNAU by the terminal, an input parameter of a security parameter carried in a message for requesting to resume an RRC connection or requesting to perform the RNAU is a security verification parameter obtained from a new serving access network device in a random access process of this RNAU. For example, an anchor access network device of the terminal 200 in FIG. 1 is the access network device 101, and a C-RNTI allocated to the terminal 200 is a C-RNTI 1. In the random access process of this RNAU, the C-RNTI allocated by the new serving access network device (the access network device 102) to the terminal 200 is a C-RNTI 2. When the terminal 200 re-initiates the RNAU, an input parameter of a MAC-I (or a short MAC-I) carried in a message that is sent to the access network device 103 and used for requesting to resume an RRC connection or requesting to perform the RNAU is the C-RNTI 2 obtained from the access network device 102 in the random access process of this RNAU. If the anchor access network device of the terminal is not changed in the RNAU performed by the access network device 102, after receiving the security parameter in the first message, the access network device 103 sends the security parameter reported by the terminal 200, to the anchor access network device (the access network device 101). The access network device 101 performs security verification. In $S10_5'$, the anchor access network device (the access network device 101) stores the security verification parameter C-RNTI 2 that is carried in the first request message and allocated by the new serving access network device (the access network device 102) to the terminal 200, and determines that the input parameter C-RNTI 2 of the security parameter reported by the terminal 200 is consistent with the security verification parameter C-RNTI 2 stored by the access network device 101, so that the security verification succeeds. If the anchor access network device of the terminal is changed in the RNAU performed by the access network device 102, a new anchor access network device is the access network device 102. After receiving the security parameter in the first message, the access network device 103 sends the security parameter reported by the terminal 200, to the new anchor access network device (the access network device 102). The access network device 102 performs security verification, and determines that the input parameter C-RNTI 2 of the security parameter reported by the terminal 200 is consistent with the security verification parameter C-RNTI 2 stored by the access network device 102, so that the security verification succeeds.

It should be noted that in a possible implementation, S113' may alternatively be the same as S113 in Embodiment 1. This is not limited in this application.

According to the communication method provided in this embodiment of this application, in each RNAU process, the new serving access network device sends the security verification parameter allocated to the terminal to the anchor access network device. In a process of re-initiating the RNAU by the terminal, the input parameter of the security parameter carried in the message for requesting to resume the RRC connection or requesting to perform the RNAU is the security verification parameter allocated by the new serving access network device to the terminal. Regardless of whether the anchor access network device is changed in this RNAU, when the RNAU is re-initiated, the input parameter (the security verification parameter) of the security parameter carried in the message for requesting to resume the RRC connection or requesting to perform the RNAU and the security verification parameter used by the access network device for security verification are both security verification parameters allocated by the new serving access network device to the terminal in this RNAU. This ensures that in the RNAU, the input parameter (the security verification parameter) of the security parameter reported by the terminal is consistent with the security verification parameter used by the access network device for security verification, so that the security verification succeeds.

Further, in S112' of Embodiment 2, after the first access network device sends the second message to the terminal, the second message sent by the first access network device to the terminal may not be received by the terminal due to a cause such as an air interface channel condition or air interface congestion. In other words, the terminal does not perform S113'. If the terminal does not receive the second message in this RNAU, when the RNAU is re-initiated, the input parameter of the security parameter carried in the message for requesting to resume the RRC connection or requesting to perform the RNAU is the security verification parameter allocated by the anchor access network device to the terminal in this RNAU. In $S10_5'$, the second access network device stores the security verification parameter allocated by the first access network device for the terminal. The security verification parameter is used for security verification to re-initiate the RNAU. Therefore, the security verification parameter used by the access network device for security verification is the security verification parameter allocated by the new serving access network device to the terminal in this RNAU. In this case, when the RNAU is re-initiated, the input parameter (the security verification parameter) of the security parameter reported by the terminal is inconsistent with the security verification parameter used by the access network device for security verification. Consequently, the security verification fails.

Figures 1A, 4:
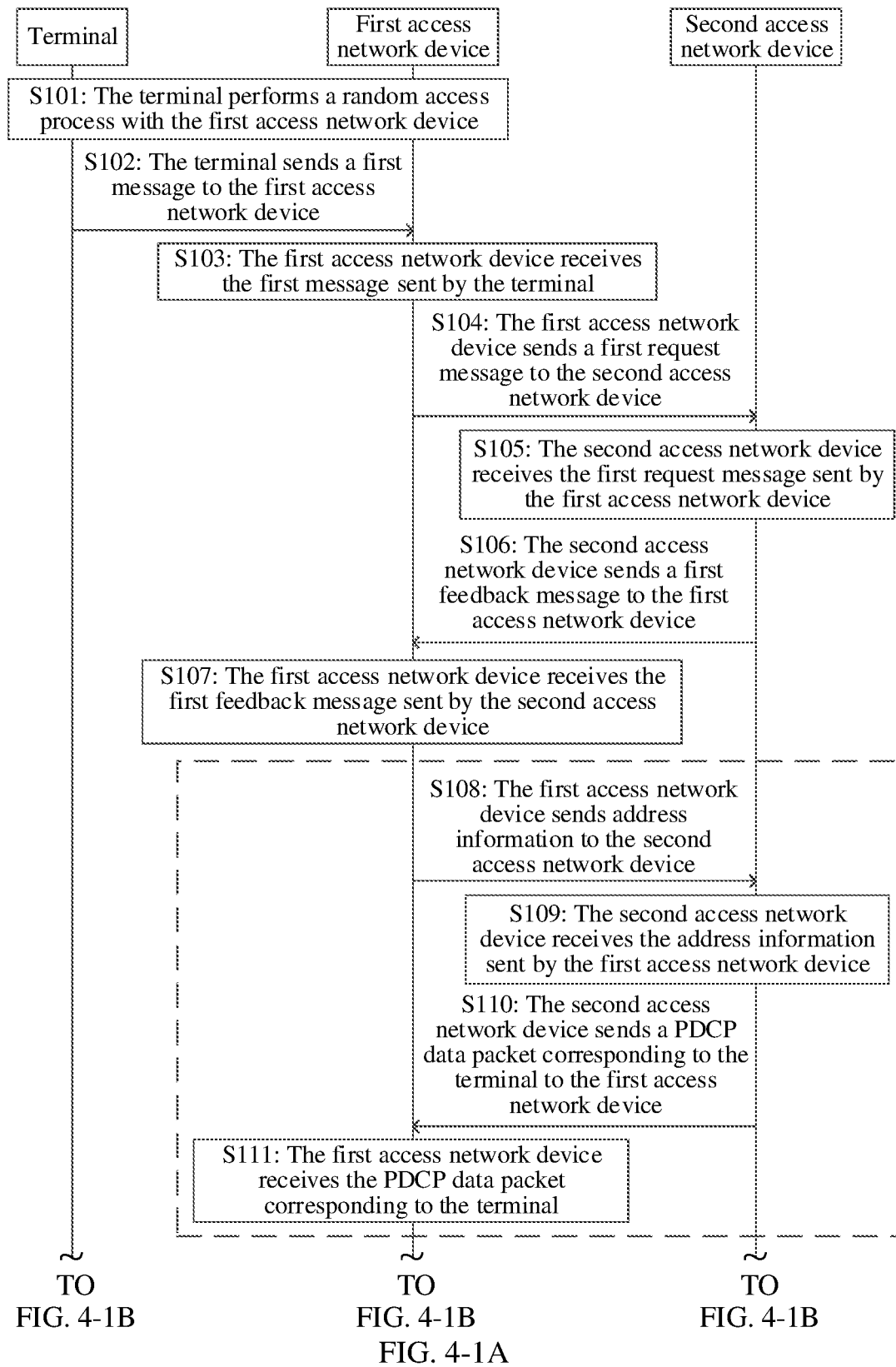
Figures 1B, 4:
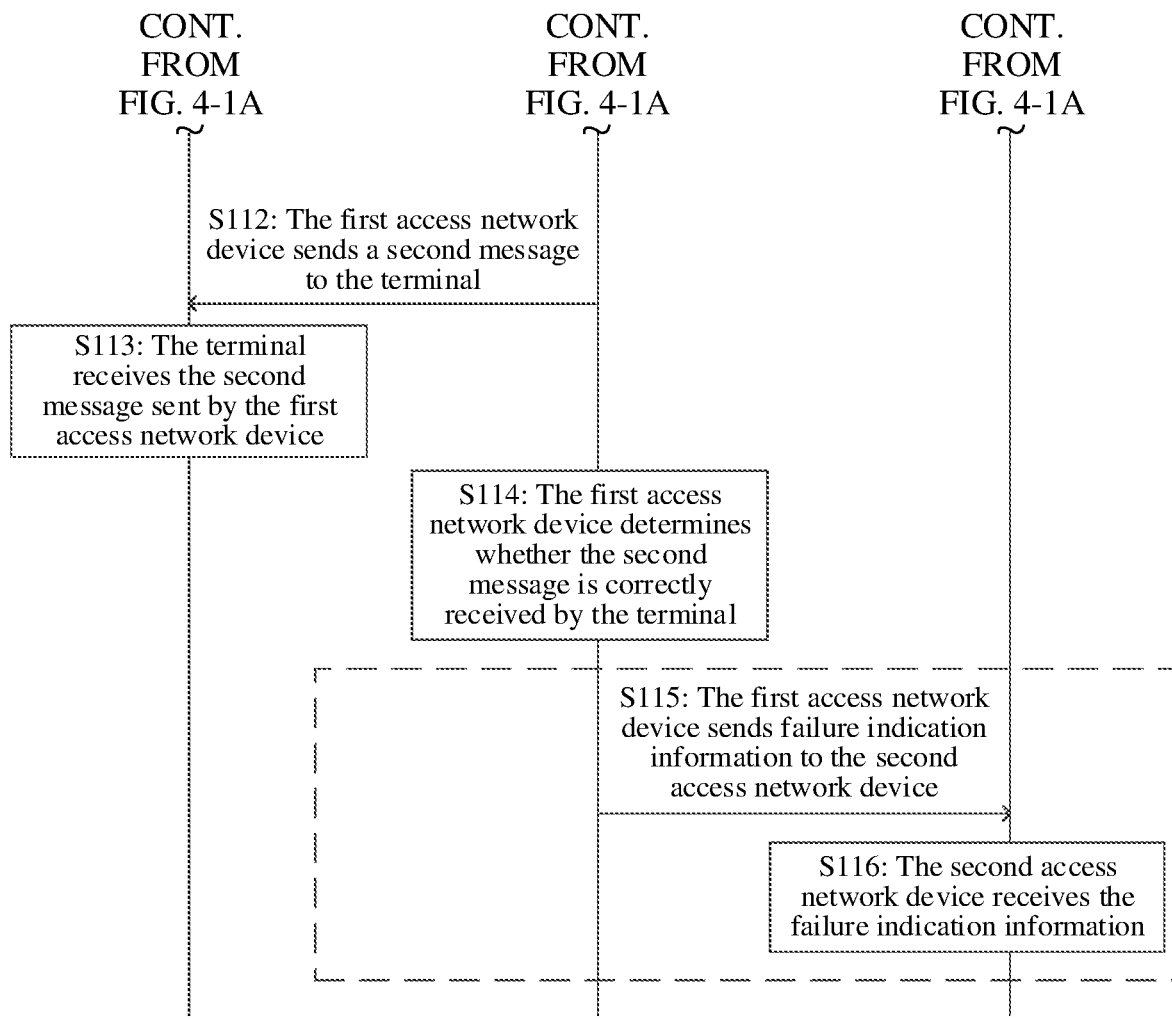

Further, according to the communication method provided in Embodiment 2 of this application, in the RNAU, if determining that the second message is not correctly received by the terminal, the access network device determines that the RNAU process fails. When the terminal re-initiates the RNAU process, the security verification parameter allocated by the anchor access network device to the terminal in this RNAU is used for security verification, to ensure that the input parameter (the security verification parameter) of the security parameter reported by the terminal in this re-initiated RNAU is consistent with the security verification parameter used by the access network device for security verification. With reference to FIG. 4, as shown in FIG. 4-1A and FIG. 4-1B, the method may further include S114 to S116.

S114: The first access network device determines whether the second message is correctly received by the terminal.

After the first access network device sends the second message to the terminal, the first access network device may further determine whether the second message is correctly received by the terminal.

In an implementation, after sending the second message to the terminal, the first access network device may start a wait timer. Before the wait timer expires, if receiving a fourth message sent by the terminal, for example, receiving an RLC ACK (Acknowledge) sent by the terminal, the first access network device determines that the second message is correctly received by the terminal. After the wait timer expires, if the first access network device does not receive the fourth message sent by the terminal, the first access network device determines that the second message is not correctly received by the terminal. The fourth message is used to indicate that the second message is correctly received by the terminal. For example, the second message includes an RRC release message, an RRC reject message, an RRC connection release message, or an RRC connection reject message. Correspondingly, the fourth message may include an RRC release acknowledge message, an RRC reject acknowledge message, an RRC connection release acknowledge message, or an RRC connection reject acknowledge message.

If it is determined that the second message is not correctly received by the terminal, S115 is performed.

S115: The first access network device sends failure indication information to the second access network device.

If determining that the second message is not correctly received by the terminal, the first access network device sends the failure indication information to the second access network device. The failure indication information is used to indicate that the second message is not correctly received by the terminal.

For example, the failure indication information may be information included in a message in the prior art. For example, a message specified in a current standard carries the failure indication information, to indicate that the second message is not correctly received by the terminal. Alternatively, the failure indication information may be a newly defined message, and the newly defined message is used to indicate that the second message is not correctly received by the terminal. For example, message type information may be used to indicate that the second message is not correctly received by the terminal. This is not limited in this embodiment of the present invention.

S116: The second access network device receives the failure indication information.

After receiving the failure indication information from the first access network device, the second access network device stores the security verification parameter allocated by the second access network device to the terminal, so that the security verification parameter is used for security verification in a next RRC connection resume process or next RNAU process of the terminal. For example, in S105', after the second access network device receives the first request message sent by the first access network device, the second access network device stores the security verification parameter that is carried in the first request message and allocated by the first access network device for the terminal. Then, in S116, the second access network device receives the failure indication information, and determines that the RRC connection resume process or RNAU process requested by the terminal this time fails. In this case, the second access network device updates the stored security verification parameter allocated by the first access network device for the terminal to the security verification parameter allocated by the second access network device to the terminal. The security verification parameter is used for security verification in a next RRC connection resume process or next RNAU process of the terminal. In the communication method, in each RNAU process, if determining that the second message is not correctly received by the terminal, the new serving access network device indicates the anchor access network device to use the security verification parameter allocated by the anchor access network device to the terminal for security verification of a next RNAU. In a process of re-initiating the RNAU by the terminal, the input parameter of the security parameter carried in the message for requesting to resume the RRC connection or requesting to perform the RNAU is the security verification parameter allocated by the anchor access network device to the terminal. In this case, in the re-initiated RNAU, the input parameter (the security verification parameter) of the security parameter carried in the message for requesting to resume the RRC connection or requesting to perform the RNAU and the security verification parameter used by the access network device for security verification are both security verification parameters allocated by the anchor access network device to the terminal in this RNAU. This ensures that in the RNAU, the input parameter (the security verification parameter) of the security parameter reported by the terminal is consistent with the security verification parameter used by the access network device for security verification, so that the security verification succeeds.

Further, in an implementation, if the terminal determines, after sending the first message to the first access network device, that the second message is not correctly received, the terminal may reduce a priority of the first access network device in a next reselection process. For example, a reselection priority of a cell served by the first access network device or a reselection priority of a frequency corresponding to a cell served by the first access network device may be reduced. In this way, a probability that a reselection process repeatedly fails can be reduced, for example, reselection to a pseudo base station can be avoided.

The communication method and beneficial effects provided in Embodiment 2 are described below with reference to an application scenario.

For example, the terminal is the terminal 200 in FIG. 1, an anchor access network device of the terminal 200 is the access network device 101 in FIG. 1, and the access network device 102 in FIG. 1 is a pseudo base station.

At a first stage, the terminal 200 sends the first message (for example, an RRC resume request message) to the access network device 102. The first access network device of this RNAU is the access network device 102. Then, the terminal 200 receives the second message (for example, an RRC release message) sent by the access network device 102. The second message includes information about a wait timer. In this case, the terminal 200 resends the first message to the access network device 102 after waiting for a period of time, for example, after the wait timer expires. For example, at the first stage, the anchor access network device of the terminal 200 is not changed.

At a second stage, after the access network device 102 (the pseudo base station) receives the first message sent by the terminal 200, the access network device 102 masquerades as a terminal, accesses a network as the terminal, and sends the first message to an access network device (for example, the access network device 103 in FIG. 1). In this case, the first access network device of the RNAU is the access network device 103, and the second access network device (the anchor access network device) is the access network device 101. According to the communication method provided in Embodiment 2, in S105', after the second access network device (the access network device 101 in FIG. 1) receives the first request message sent by the first access network device (the access network device 103), the access network device 101 may store the security verification parameter that is carried in the first request message and allocated by the first access network device (the access network device 103) to the terminal. In addition, in S112', the first access network device (the access network device 103) sends the second message to the terminal (the access network device 102). After the wait timer expires, if the access network device 103 does not receive the fourth message sent by the terminal (the access network device 102), the access network device 103 determines that the second message is not correctly received by the terminal (the access network device 102). The first access network device (the access network device 103) sends the failure indication information to the second access network device (the access network device 101). After receiving the failure indication information, the access network device 101 stores the security verification parameter allocated by the second access network device (the access network device 101) to the terminal (the access network device 102). The security verification parameter is used for security verification in a next RRC connection resume process or next RNAU process of the terminal (the access network device 102).

In this case, in a process of performing a next RNAU by the terminal (the access network device 102), the input parameter (the security verification parameter) of the security parameter carried in the message for requesting to resume the RRC connection or requesting to perform the RNAU and the security verification parameter used by the access network device for security verification are both security verification parameters allocated by the anchor access network device to the terminal in this RNAU. This ensures that in the RNAU, the input parameter (the security verification parameter) of the security parameter reported by the terminal is consistent with the security verification parameter used by the access network device for security verification, so that the security verification succeeds.

Embodiment 3

This embodiment of this application further provides a communication method. In Embodiment 3, a procedure of interaction between a terminal device, a first access network device, and a second access network device is similar to the procedure of interaction between the terminal device, the first access network device, and the second access network device in Embodiment 1. This embodiment of this application is not shown in another figure. A main difference of the communication method in Embodiment 3 from the communication method in Embodiment 1 in that implementations of S106, S107, S112, and S113 may be different. S106, S107, S112, and S113 are denoted as S106', S107', S112", and S113" herein.

In S105, if determining that the anchor access network device is changed, the second access network device transfers a context of the terminal. In S106', a first feedback message sent by the second access network device to the first access network device may further include a security verification parameter allocated by the second access network device to the terminal. For example, the first feedback message sent by the second access network device (the access network device 101) to the first access network device (the access network device 102) further includes a C-RNTI 1 allocated by the access network device 101 to the terminal 200.

In S107', after receiving the first feedback message sent by the second access network device, the first access network device may further store the security verification parameter that is carried in the first feedback message and allocated by the second access network device to the terminal.

S112": The first access network device sends a second message to the terminal.

S112" is the same as S112' in Embodiment 2, and details are not described herein again.

S113": The terminal receives the second message sent by the first access network device.

It is different from S113 in Embodiment 1 that, when the second message does not include the first information, the terminal receives the second message sent by the first access network device, and determines that a status of the terminal is an RRC inactive state. In a process of re-initiating an RNAU by the terminal, an input parameter of a security parameter carried in a message for requesting to resume an RRC connection or requesting to perform the RNAU is a security verification parameter allocated by an anchor access network device to the terminal in this RNAU. For example, an anchor access network device of the terminal 200 in FIG. 1 is the access network device 101, and a C-RNTI allocated to the terminal 200 is a C-RNTI 1. In a random access process of this RNAU, a C-RNTI allocated by a new serving access network device (the access network device 102) to the terminal 200 is a C-RNTI 2. When the terminal 200 re-initiates the RNAU, an input parameter of a MAC-I (or a short MAC-I) carried in a message that is sent to the access network device 103 and used for requesting to resume an RRC connection or requesting to perform the RNAU is a C-RNTI, the C-RNTI 1, allocated by the anchor access network device (the access network device 101) to the terminal 200. If the anchor access network device is not changed in this RNAU, after receiving the security parameter in the first message, the access network device 103 sends the security parameter reported by the terminal 200, to the anchor access network device (the access network device 101). The access network device 101 performs security verification, and determines that the input parameter C-RNTI 1 of the security parameter reported by the terminal 200 is consistent with the security verification parameter C-RNTI 1 stored by the access network device 101, so that the security verification succeeds. If the anchor access network device is changed in this RNAU, a new anchor access network device is the access network device 102. After receiving the security parameter in the first message, the access network device 103 sends the security parameter reported by the terminal 200, to the new anchor access network device (the access network device 102). In S107', the new anchor access network device (the access network device 102) stores the security verification parameter C-RNTI 1 that is carried in the first feedback message and allocated by the anchor access network device (the access network device 101) to the terminal 200, and determines that the input parameter C-RNTI 1 of the security parameter reported by the terminal 200 is consistent with the security verification parameter C-RNTI 1 stored by the access network device 102, so that the security verification succeeds.

It should be noted that in a possible implementation, S113" may alternatively be the same as S113 in Embodiment 1. This is not limited in this application.

According to the communication method provided in this embodiment of this application, in each RNAU process, if the anchor access network device is changed, the anchor access network device sends the security verification parameter allocated to the terminal to the new serving access network device. In a process of re-initiating the RNAU by the terminal, the input parameter of the security parameter carried in the message for requesting to resume the RRC connection or requesting to perform the RNAU is the security verification parameter allocated by the anchor access network device to the terminal. Regardless of whether the anchor access network device is changed in this RNAU, when the RNAU is re-initiated, the input parameter (the security verification parameter) of the security parameter carried in the message for requesting to resume the RRC connection or requesting to perform the RNAU and the security verification parameter used by the access network device for security verification are both security verification parameters allocated by the anchor access network device to the terminal in this RNAU. This ensures that in the RNAU, the input parameter (the security verification parameter) of the security parameter reported by the terminal is consistent with the security verification parameter used by the access network device for security verification, so that the security verification succeeds.

The foregoing mainly describes, from a perspective of interaction between the access network device and the terminal, the solutions provided in the embodiments of this application. It may be understood that to implement the foregoing functions, the access network device and the terminal include corresponding hardware structures and/or software modules for implementing the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. The person skilled in the art may use different methods to implement the described functions for each particular application, but it should not be considered that the implementation goes beyond the scope of this application.

In the embodiments of this application, function modules of the access network device and the terminal may be divided based on the foregoing method examples. For example, each function module may be obtained through division based on each corresponding function, or two or more functions may be integrated into one processing module. The integrated module may be implemented in a form of hardware, or may be implemented in a form of a software function module. It should be noted that module division in the embodiments of this application is an example, and is merely a logical function division. During actual implementation, another division manner may be used. An example in which function modules are divided based on functions is used below for description.

Figure 5:
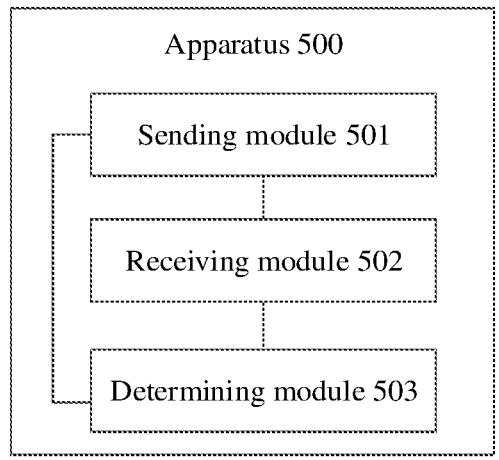
FIG. 5 is a first schematic structural diagram of a communications apparatus according to an embodiment of this application.

FIG. 5 is a schematic structural diagram of an apparatus 500 according to an embodiment of this application. The apparatus 500 may be a terminal, and can implement a function of the terminal in the methods provided in the embodiments of this application. The apparatus 500 may alternatively be an apparatus that can support a terminal in implementing a function of the terminal in the methods provided in the embodiments of this application. The apparatus 500 may be a hardware structure, a software module, or a combination of a hardware structure and a software module. The apparatus 500 may be implemented by a chip system. In this embodiment of this application, the chip system may include a chip, or may include a chip and another discrete component. As shown in FIG. 5, the apparatus 500 includes a sending module 501, a receiving module 502, and a determining module 503.

The sending module 501 is configured to send a first message to an access network device. The first message is used for requesting to resume an RRC connection or requesting to perform a radio access network-based notification area update (RNAU). The access network device is a new serving access network device of the terminal.

The receiving module 502 is configured to receive a second message from the access network device. The second message includes first information, the first information is related to a security verification parameter, and the security verification parameter includes a cell radio network temporary identifier (C-RNTI).

The determining module 503 is configured to determine the security verification parameter based on the first information.

It should be noted that, for all related content of the steps in the foregoing method embodiments, refer to the descriptions of the functions of the corresponding function modules. For example, the sending module 501 may be configured to perform at least S102 in FIG. 4, and/or perform another step described in this application. The receiving module 502 may be configured to perform at least S113 in FIG. 4, and/or perform another step described in this application. The determining module 503 may be configured to perform at least S113 in FIG. 4, and/or perform another step described in this application. Details are not described herein again.

Figure 6:
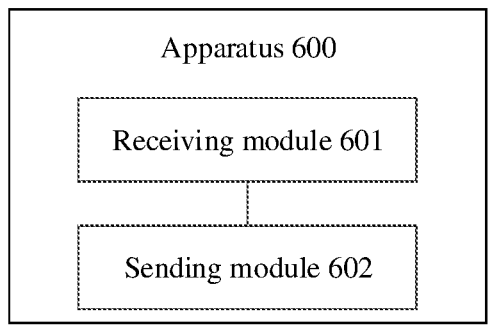
FIG. 6 is a second schematic structural diagram of a communications apparatus according to an embodiment of this application.

FIG. 6 is a schematic structural diagram of an apparatus 60o according to an embodiment of this application. The apparatus 60o may be an access network device, and can implement a function of the first access network device in the methods provided in the embodiments of this application. The apparatus 60o may alternatively be an apparatus that can support an access network device in implementing a function of the first access network device in the methods provided in the embodiments of this application. The apparatus 60o may be a hardware structure, a software module, or a combination of a hardware structure and a software module. As shown in FIG. 6, the apparatus 60o includes a receiving module 601 and a sending module 602.

The receiving module 601 is configured to receive a first message from a terminal. The first message is used for requesting to resume an RRC connection or requesting to perform a radio access network-based notification area update (RNAU). The first access network device is a new serving access network device of the terminal.

The sending module 602 is configured to send a second message to the terminal.

In an implementation, the second message includes first information, the first information is related to a security verification parameter, and the security verification parameter includes a cell radio network temporary identifier (C-RNTI).

In an implementation, the apparatus 600 may further include a determining module 603. The determining module 603 is configured to determine, based on a first feedback message, whether the context of the terminal is transferred.

It should be noted that, for all related content of the steps in the foregoing method embodiments, refer to the descriptions of the functions of the corresponding function modules. For example, the receiving module 601 may be configured to perform at least S103, S107, and S111 in FIG. 4 and FIG. 4-1A, or perform S103, S107', and Sm in FIG. 4 and FIG. 4-1A, and/or perform another step described in this application. The sending module 602 may be configured to perform at least S104, S108, and S112 in FIG. 4, FIG. 4-1A, and FIG. 4-1B, and S115 in FIG. 4-1B, or perform S104', S108, and S112' (or S112") in FIG. 4, FIG. 4-1A, and FIG. 4-1B, and S115 in FIG. 4-1B, and/or perform another step described in this application. The determining module 603 may be configured to perform at least S114 in FIG. 4-1B, and/or perform another step described in this application. Details are not described herein again.

Figure 7:
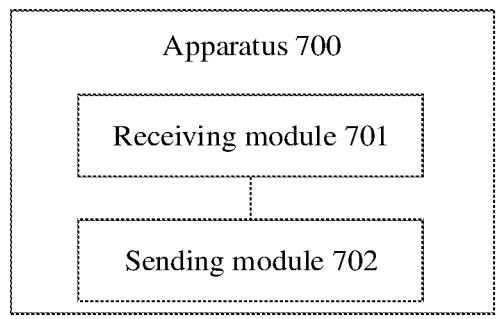
FIG. 7 is a third schematic structural diagram of a communications apparatus according to an embodiment of this application.

FIG. 7 is a schematic structural diagram of an apparatus 700 according to an embodiment of this application. The apparatus 700 may be an access network device, and can implement a function of the second access network device in the methods provided in the embodiments of this application. The apparatus 700 may alternatively be an apparatus that can support an access network device in implementing a function of the second access network device in the methods provided in the embodiments of this application. The apparatus 700 may be a hardware structure, a software module, or a combination of a hardware structure and a software module. As shown in FIG. 7, the apparatus 700 includes a receiving module 701 and a sending module 702.

The receiving module 701 is configured to receive a first request message from a first access network device. The first access network device is a new serving access network device of a terminal, a second access network device is an anchor access network device of the terminal, the first request message is used by the first access network device to request a context of the terminal from the second access network device, the first request message includes first indication information, and the first indication information is used to indicate that the terminal requests an RNAU, requests to resume an RRC connection, sends uplink data, or sends uplink signaling.

The sending module 702 is configured to send a first feedback message to the first access network device. The first feedback message is used by the first access network device to determine whether the context of the terminal is transferred.

It should be noted that, for all related content of the steps in the foregoing method embodiments, refer to the descriptions of the functions of the corresponding function modules. For example, the receiving module 701 may be configured to perform at least S105 and S109 in FIG. 4 and FIG. 4-1A and S116 in FIG. 4-1B, or perform S105' and S109 in FIG. 4 and FIG. 4-1A and S116 in FIG. 4-1B, and/or perform another step described in this application. The sending module 702 may be configured to perform at least S106 and Si lo in FIG. 4 and FIG. 4-1A, or perform S106' and Silo in FIG. 4 and FIG. 4-1A, and/or perform another step described in this application.

Figure 8:
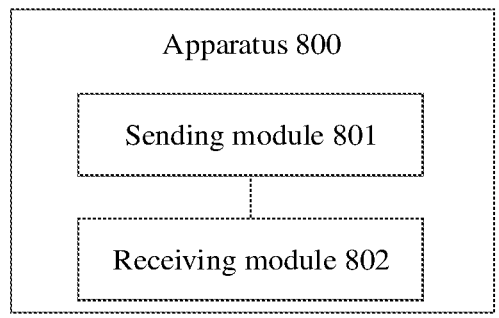
FIG. 8 is a fourth schematic structural diagram of a communications apparatus according to an embodiment of this application.

FIG. 8 is a schematic structural diagram of an apparatus Boo according to an embodiment of this application. The apparatus Boo may be a terminal, and can implement a function of the terminal in the methods provided in the embodiments of this application. The apparatus Boo may alternatively be an apparatus that can support a terminal in implementing a function of the terminal in the methods provided in the embodiments of this application. The apparatus Boo may be a hardware structure, a software module, or a combination of a hardware structure and a software module. The apparatus 80o may be implemented by a chip system. In this embodiment of this application, the chip system may include a chip, or may include a chip and another discrete component. As shown in FIG. 8, the apparatus 800 includes a sending module 801 and a receiving module 802.

The sending module 801 is configured to send a first message to an access network device. The first message is used for requesting to resume an RRC connection or requesting to perform an RNAU. The access network device is a new serving access network device of the terminal. The first message includes a security parameter, the security parameter is generated by using a security verification parameter as an input parameter, and the security verification parameter includes a cell radio network temporary identifier (C-RNTI). The security verification parameter is allocated by a serving access network device to the terminal in a previous RNAU process of the RNAU process of the terminal.

The receiving module 802 is configured to receive a second message from the access network device. The second message is a response message of the first message.

It should be noted that, for all related content of the steps in the foregoing method embodiments, refer to the descriptions of the functions of the corresponding function modules. For example, the sending module 801 may be configured to perform at least S102 in FIG. 4, and/or perform another step described in this application. The receiving module 802 may be configured to perform at least S113' in FIG. 4 and FIG. 4-1B, and/or perform another step described in this application. Details are not described herein again.

Figure 9:
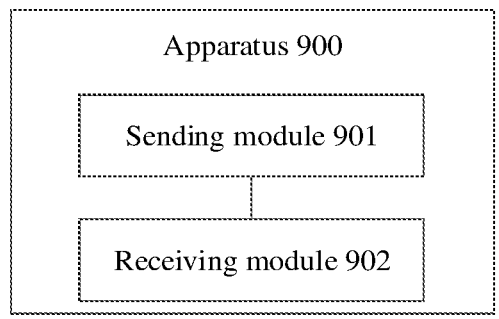
FIG. 9 is a fifth schematic structural diagram of a communications apparatus according to an embodiment of this application.

FIG. 9 is a schematic structural diagram of an apparatus 900 according to an embodiment of this application. The apparatus 900 may be a terminal, and can implement a function of the terminal in the methods provided in the embodiments of this application. The apparatus 900 may alternatively be an apparatus that can support a terminal in implementing a function of the terminal in the methods provided in the embodiments of this application. The apparatus 900 may be a hardware structure, a software module, or a combination of a hardware structure and a software module. The apparatus 900 may be implemented by a chip system. In this embodiment of this application, the chip system may include a chip, or may include a chip and another discrete component. As shown in FIG. 9, the apparatus 900 includes a sending module 901 and a receiving module 902.

The sending module 901 is configured to send a first message to an access network device. The first message is used for requesting to resume an RRC connection or requesting to perform an RNAU. The access network device is a new serving access network device of the terminal. The first message includes a security parameter, the security parameter is generated by using a security verification parameter as an input parameter, and the security verification parameter includes a cell radio network temporary identifier (C-RNTI). The security verification parameter is allocated by an anchor access network device to the terminal in a previous RNAU process of the RNAU process of the terminal.

The receiving module 902 is configured to receive a second message from the access network device. The second message is a response message of the first message.

It should be noted that, for all related content of the steps in the foregoing method embodiments, refer to the descriptions of the functions of the corresponding function modules. For example, the sending module 901 may be configured to perform at least S102 in FIG. 4 and FIG. 4-1A, and/or perform another step described in this application. The receiving module 902 may be configured to perform at least S113" in FIG. 4 and FIG. 4-1B, and/or perform another step described in this application. Details are not described herein again.

In the embodiments, the apparatus 500, the apparatus 600, the apparatus 700, the apparatus 800, or the apparatus 900 may be presented in a form of function modules obtained through division in an integration manner. The "module" herein may be a specific ASIC, a circuit, a processor executing one or more software or firmware programs, a storage device, an integrated logic circuit, and/or another component that can provide the foregoing functions.

Figure 10:
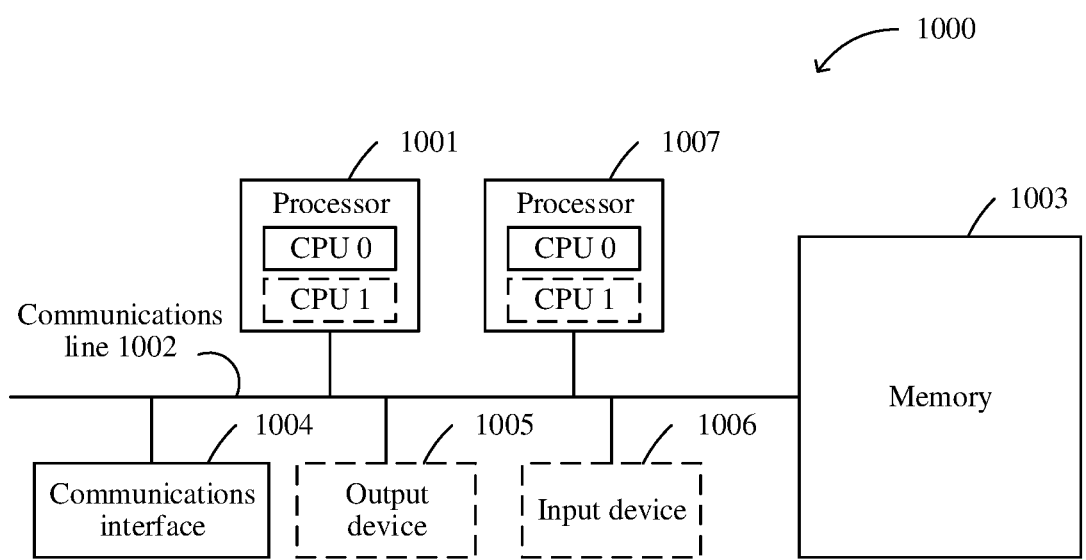
FIG. 10 is a sixth schematic structural diagram of a communications apparatus according to an embodiment of this application.

In a simple embodiment, the apparatus 500, the apparatus 600, the apparatus 700, the apparatus 800, or the apparatus 900 may be in a form shown in FIG. 10.

As shown in FIG. 10, an apparatus 1000 may include at least one processor 1001, a communications line 1002, and at least one communications interface 1004. Optionally, the apparatus 1000 may further include a memory 1003. The processor 1001, the memory 1003, and the communications interface 1004 may be connected to each other through the communications line 1002.

The processor 1001 may be a central processing unit (Central Processing Unit, CPU), an application-specific integrated circuit (ASIC), or one or more integrated circuits configured to implement the embodiments of this application, for example, one or more digital signal processors (Digital Signal Processor, DSP) or one or more field programmable gate arrays (Field Programmable Gate Array, FPGA).

The communications line 1002 may include a path for transmitting information between the foregoing components.

The communications interface 1004 is configured to communicate with another device or a communications network, and may use any apparatus such as a transceiver.

The memory 1003 may be a read-only memory (Read-Only Memory, ROM) or another type of static storage device capable of storing static information and instructions, or a random access memory (Random Access Memory, RAM) or another type of dynamic storage device capable of storing information and instructions, or may be an electrically erasable programmable read-only memory (EEPROM), a compact disc read-only memory (CD-ROM), or another compact disc storage or optical disc storage (including a compressed optical disc, a laser disc, an optical disc, a digital versatile disc, a Blu-ray optical disc, and the like), a magnetic disk storage medium or another magnetic storage device, or any other medium capable of including or storing expected program code in a form of instructions or data structures and capable of being accessed by a computer, but is not limited thereto. In a possible design, the memory 1003 may be independent of the processor 1001. To be specific, the memory 1003 may be an external memory of the processor 1001. In this case, the memory 1003 may be connected to the processor 1001 through the communications line 1002, and is configured to store an execution instruction or application program code, and the processor 1001 controls execution of the execution instruction or the application program code, to implement the communication methods provided in the foregoing embodiments of this application. In another possible design, the memory 1003 may alternatively be integrated with the processor 1001. To be specific, the memory 1003 may be an internal memory of the processor 1001, and may be configured to temporarily store some data, instruction information, and the like. For example, the memory 1003 is a cache.

In a possible implementation, the processor 1001 may include one or more CPUs, for example, a CPU 0 and a CPU 1 in FIG. 10. In another possible implementation, the communications apparatus 1000 may include a plurality of processors, for example, the processor 1001 and a processor 1007 in FIG. 10. In still another possible implementation, the communications apparatus 1000 may further include an output device 1005 and an input device 1006.

It should be noted that the communications apparatus 1000 may be a general-purpose device or a dedicated device. For example, the communications apparatus 1000 may be a desktop computer, a portable computer, a network server, a PDA, a mobile phone, a tablet computer, a wireless terminal, an embedded device, or a device having a structure similar to that in FIG. 10. A type of the communications apparatus 1000 is not limited in this embodiment of this application.

It should be noted that, in a specific implementation process, the apparatus 1000 may further include other hardware components, which are not enumerated one by one in this specification.

In an example of this application, the determining module 503 in FIG. 5 may be implemented by using the processor 1001, and the sending module 501 and the receiving module 502 in FIG. 5, the receiving module 601 and the sending module 602 in FIG. 6, the receiving module 701 and the sending module 702 in FIG. 7, the sending module 801 and the receiving module 802 in FIG. 8, or the sending module 901 and the receiving module 902 in FIG. 9 may be implemented by using the communications interface 1004.

The apparatus provided in this embodiment of this application may be configured to perform the foregoing communication methods. Therefore, for technical effects that can be obtained by the apparatus, refer to the foregoing method embodiments. Details are not described herein again.

A person of ordinary skill in the art may understand that all or some of the steps of the foregoing methods may be implemented by a program instructing relevant hardware. The program may be stored in a computer-readable storage medium. The computer-readable storage medium is, for example, a ROM, a RAM, and an optical disc.

An embodiment of this application further provides a storage medium. The storage medium may include a memory 1003.

For explanations and beneficial effects of related content in any one of the foregoing provided apparatuses, refer to the corresponding method embodiment provided above. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, a network device, user equipment, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, definitely, various modifications and combinations may be made to them without departing from the scope of this application. Correspondingly, the specification and accompanying drawings are merely example description of this application defined by the accompanying claims, and is considered as any of or all modifications, variations, combinations or equivalents that cover the scope of this application. Clearly, the person skilled in the art can make various modifications and variations to this application without departing from the scope of this application. This application is intended to cover these modifications and variations of this application, provided that they fall within the scope of protection defined by the following claims and their equivalent technologies in this application.

What is claimed is:

1. A communication method applied in a radio resource control (RRC) inactive state, comprising:
    receiving, by a second access network device, a first request message from a first access network device, wherein the first request message comprises a cell radio network temporary identifier (C-RNTI), wherein the C-RNTI is allocated by the first access network device for a terminal, wherein the second access network device is an access network device that retains a context of the terminal, wherein the first request message requests the context of the terminal as part of a first procedure for a random access process, wherein the first procedure is requesting to resume a radio resource control (RRC) connection, or requesting to perform an radio access network-based notification area update (RNAU) process, wherein a control plane link of the terminal exists between the second access network device and a core network, wherein the first access network device is a current serving access network device, wherein transfer of the context of the terminal is associated with, for the first procedure, changing from using the first access network device as an anchor access network device for the terminal to using the second access network device as an anchor access network device for the terminal, and wherein not transferring the context of the terminal is associated with maintaining, for the first procedure, the first access network device as the anchor access network device for the terminal;
    storing, by the second access network device, the C-RNTI allocated by the first access network device;
    determining, by the second access network device, to not transfer the context in response to a distance between a cell of the second access network device and a cell of the first access network device being less than a distance threshold;
    sending, by the second access network device, to the first access network device, a feedback message associated with the first request message, wherein the feedback message indicates not to transfer the context; and
    performing, by the second access network device, in response to the feedback message indicating to not transfer the context and using the C-RNTI allocated by the first access network device, at least one of security verification in a next radio resource control (RRC) connection resume process or a next RNAU process of the terminal; and
    determining, during the next RRC connection resume process or the next RNAU process, whether the security verification succeeds by comparing a C-RNTI reported by the terminal with the C-RNTI stored at the second access network device, and permitting the next RRC connection resume process or the next RNAU according to whether the security verification succeeds.

2. The method according to claim 1, wherein the first request message further comprises a physical cell identifier.

3. The method according to claim 1, wherein the first request message is a retrieve user equipment (UE) context request, wherein the retrieve UE context request further comprises first indication information, and wherein the first indication information indicates that the terminal requests an RNAU or requests to resume an RRC connection.

4. The method according to claim 1, wherein the feedback message is a retrieve user equipment (UE) context failure message.

5. A communications system, comprising:
    a first access network device; and
    a second access network device;
    wherein the first access network device is configured to receive a first message from a terminal in a radio resource control (RRC) inactive state, wherein the first message requests performance of, for a random access process, a first procedure that is one of a radio access network-based notification area update (RNAU) or resumption of an RRC connection, and is further configured to send a first request message to the second access network device, wherein the first request message comprises a cell radio network temporary identifier (C-RNTI), wherein the C-RNTI is allocated by the first access network device for the terminal, wherein the first request message requests a context of the terminal as part of a first procedure, wherein the second access network device is an access network device that retains the context of the terminal, wherein a control plane link of the terminal exists between the second access network device and a core network, wherein the first access network device is a current serving access network device; and
    wherein the second access network device is configured to receive the first request message from the first access network device, wherein the second access network device is further configured to store the C-RNTI allocated by the first access network device; wherein the second access network is further configured to determine to not transfer the context in response to a distance between a cell of the second access network device and a cell of the first access network device being less than a distance threshold;
    wherein the first access network device is further configured to receive a feedback message associated with the first request message from the second access network device, and wherein the feedback message indicates to not transfer the context, wherein transfer of the context of the terminal is associated with, for the first procedure, changing from using the first access network device as an anchor access network device for the terminal to using the second access network device as an anchor access network device for the terminal, and wherein not transferring the context of the terminal is associated with maintaining, for the first procedure, the first access network device as the anchor network device for the terminal;

wherein the second access network device is further configured to perform, in response to the feedback message indicating to not transfer the context and using the C-RNTI allocated by the first access network device, at least one of security verification in a next RRC connection resume process or a next RNAU process of the terminal; and wherein the second access network device is further configured to determine, during the next RRC connection resume process or the next RNAU process, whether the security verification succeeds by comparing a C-RNTI reported by the terminal is with the C-RNTI stored at the second access network device, and to permit the next RRC connection resume process or the next RNAU according to whether the security verification succeeds.

6. The system according to claim 5, wherein the first request message further comprises a physical cell identifier.

7. The system according to claim 5, wherein the first request message is a retrieve user equipment (UE) context request, wherein the retrieve UE context request further comprises first indication information, and wherein the first indication information indicates that the terminal requests at least one of an RNAU or resumption of an RRC connection.

8. The system according to claim 5, wherein the feedback message is a retrieve user equipment (UE) context failure message.

9. The method of claim 1, wherein the first request message is associated with a security verification parameter, and wherein the security verification parameter includes the C-RNTI.

10. The method of claim 1, wherein the first request message requests performance of the RNAU and indicates that an anchor access network device is changed on a network side.

11. The system of claim 5, wherein the first request message is associated with a security verification parameter, and wherein the security verification parameter includes the C-RNTI; and wherein the first request message requests performance of the RNAU and indicates that an anchor access network device is changed on a network side.

* * * * *

UNITED STATES PATENT AND TRADEMARK OFFICE
CERTIFICATE OF CORRECTION

PATENT NO. : 11,470,674 B2
APPLICATION NO. : 17/126563
DATED : October 11, 2022
INVENTOR(S) : Yinghao Jin et al.

It is certified that error appears in the above-identified patent and that said Letters Patent is hereby corrected as shown below:

In the Specification

In the Detailed Description of Illustrative Embodiments, Column 19, Line 36; delete "includS101" and insert --include S101--.

In the Detailed Description of Illustrative Embodiments, Column 30, Line 32; insert --lies-- between "1" and "in".

In the Detailed Description of Illustrative Embodiments, Column 30, Line 34; delete "$S104$" and insert --S104--.

In the Detailed Description of Illustrative Embodiments, Column 31, Line 23; delete "$S10_5$" and insert --S105--.

In the Detailed Description of Illustrative Embodiments, Column 32, Line 18; delete "$S10_5$" and insert --S105--.

In the Detailed Description of Illustrative Embodiments, Column 35, Line 35; insert --lies-- between "1" and "in".

In the Detailed Description of Illustrative Embodiments, Column 38, Lines 17, 18, 21, 25, and 27; delete "60o" and insert --600--.

In the Detailed Description of Illustrative Embodiments, Column 38, Line 52; delete "Sm" and insert --S111--.

In the Detailed Description of Illustrative Embodiments, Column 39, Lines 40, 41, 43, and 47; delete "Boo" and insert --800--.

Signed and Sealed this
Twenty-second Day of November, 2022

Katherine Kelly Vidal
*Director of the United States Patent and Trademark Office*

CERTIFICATE OF CORRECTION (continued)
U.S. Pat. No. 11,470,674 B2

In the Detailed Description of Illustrative Embodiments, Column 39, Line 48; delete "80*o*" and insert --800--.